(12) United States Patent
Kamisuwa et al.

(10) Patent No.: US 7,256,380 B2
(45) Date of Patent: *Aug. 14, 2007

(54) IMAGE READING APPARATUS

(75) Inventors: Yoshikatsu Kamisuwa, Kawasaki (JP); Koji Tanimoto, Tagata (JP); Jun Sakakibara, Tokyo (JP); Kunihiko Miura, Hiratsuka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 227 days.

This patent is subject to a terminal disclaimer.

(21) Appl. No.: 10/796,820

(22) Filed: Mar. 9, 2004

(65) Prior Publication Data
US 2005/0199781 A1 Sep. 15, 2005

Related U.S. Application Data

(63) Continuation-in-part of application No. 10/791,590, filed on Mar. 2, 2004, now abandoned.

(60) Provisional application No. 60/452,338, filed on Mar. 5, 2003.

(51) Int. Cl.
*H01L 27/00* (2006.01)
*H04N 1/46* (2006.01)

(52) U.S. Cl. .................. 250/208.1; 358/514; 358/512

(58) Field of Classification Search ............. 250/208.1, 250/214.1; 355/54, 55; 358/509, 505, 512–514, 358/461, 475, 482, 521
See application file for complete search history.

(56) References Cited

U.S. PATENT DOCUMENTS 6,831,761 B2 * 12/2004 Cardot ................. 358/505

FOREIGN PATENT DOCUMENTS

| JP | 10-136151 | 5/1998 |
| JP | 2001-238053 | 8/2001 |

OTHER PUBLICATIONS

U.S. Appl. No. 60/452,323, filed Mar. 5, 2003, Tanimoto.
U.S. Appl. No. 09/955,090, filed Sep. 19, 2001, Sakakibara.
U.S. Appl. No. 10/377,818, filed Mar. 4, 2003, Sakakibara.
U.S. Appl. No. 10/378,066, filed Mar. 4, 2003, Sakakibara.

* cited by examiner

*Primary Examiner*—Thanh X. Luu
*Assistant Examiner*—Tony Ko
(74) *Attorney, Agent, or Firm*—SoCal IP Law Group LLP; Steven C. Sereboff; John E Gunther

(57) ABSTRACT

Methods and apparatus for color signal compensation are disclosed. A quality of one type of signal is enhanced using a second type of signal, wherein the second type of signal has a higher quality than that of the unenhanced first type of signal. This may be used in an image forming apparatus for scanning a color image, and using higher-resolution monochrome signals to enhance the resolution of lower-resolution color signals.

14 Claims, 34 Drawing Sheets

IMAGE READING APPARATUS

RELATED APPLICATION INFORMATION

This application is a continuation-in-part of U.S. application Ser. No. 60/132,338 filed Mar. 5, 2003, which is incorporated herein by reference, and a continuation-in-part of U.S. application Ser. No. 10/791,390, filed Mar. 2, 2004 now abandoned.

This application is related to U.S. application Ser. No. 09/955,090, which is incorporated herein by reference for its disclosure of a scanner, its construction and operation.

This application is related to U.S. application Ser. No. 10/769,616 filed Jan. 30, 2004 which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to color signal compensation.

2. Description of Related Art

Typical image sensors, such as those used in color copiers are one-dimensional and have either a 3-line CCD unit or a 4-line CCD unit. A typical 3-line CCD unit has three photodiode arrays—one for each of the three primary colors R, G and B. A typical 4-line CCD unit has, in addition to the RGB photodiode arrays, a monochrome (B/W) photodiode arrays.

Many image reading devices, such as color copiers, include a color mode and a monochrome mode. In the color mode, a color image is read. In the monochrome mode, a monochrome image is read. The typical 3-line CCD unit extracts a monochrome signal from the signals from the RGB photodiode arrays. The typical 4-line CCD unit obtains a monochrome signal from the B/W photodiode arrays.

DETAILED DESCRIPTION OF THE INVENTION

Throughout this description, the embodiments and examples shown should be considered as exemplars, rather than limitations on the apparatus and methods of the present invention.

Figure 1:
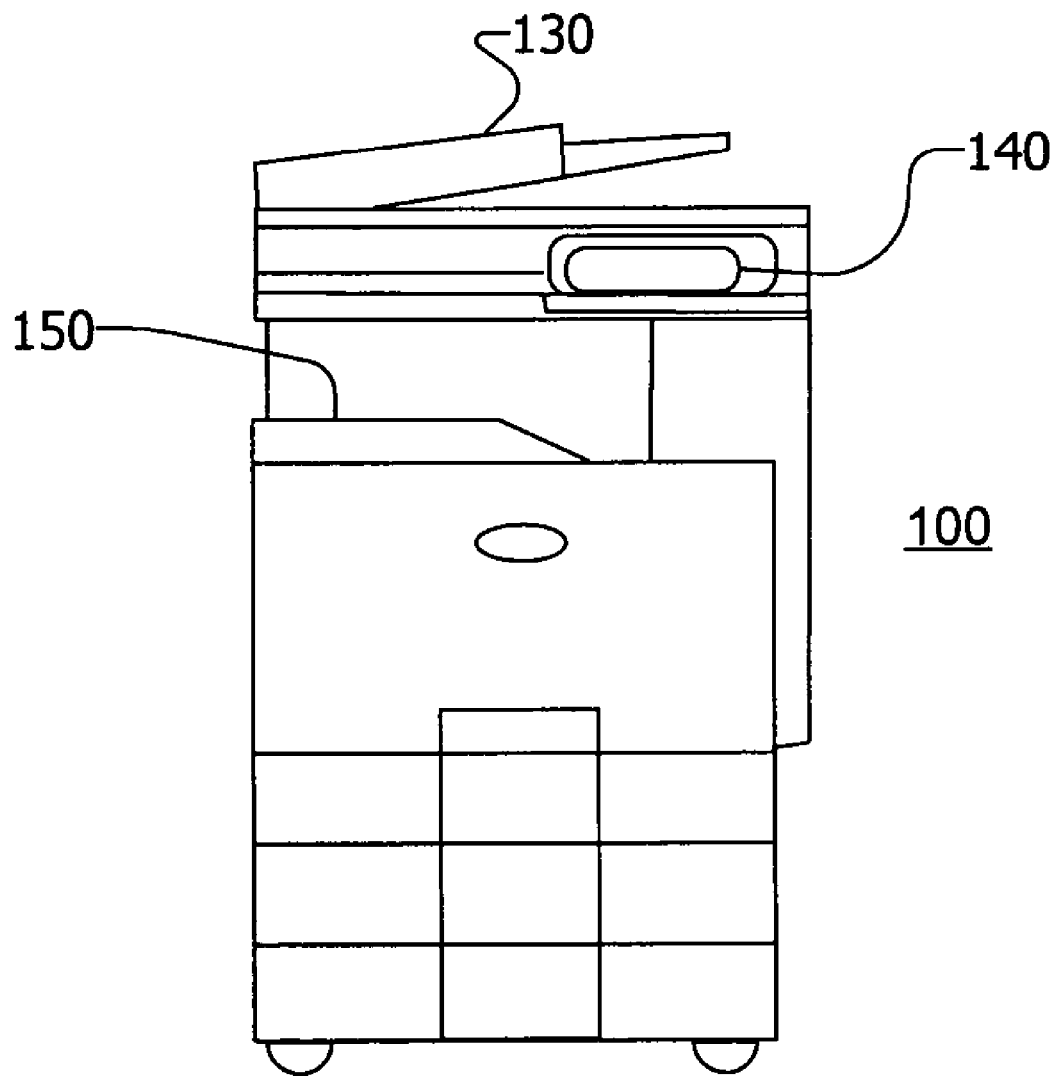
FIG. 1 is a frontal outline view of an image forming apparatus in accordance with the invention.

Referring now to FIG. 1, there is shown a frontal outline view of an image forming apparatus 100 in accordance with the invention. The image forming apparatus 100 may be, for example, a copier, fax, printer or multi-function peripheral (MFP). The image forming apparatus 100 may form the image on such media as paper or overhead transparencies.

The image forming apparatus 100 is one type of an image reading apparatus. As used herein, an "image reading apparatus" is a unitary electronic device which forms images. An image reading apparatus may also be a still camera, video camera, telescope, scanner, bar code reader, robot having machine vision, or other device which incorporates an image sensor.

The image forming apparatus 100 has an input feeder 130, an operation element 140 and an output tray 150. The input feeder 130, the operation element 140 and the output tray 150 may be configured as those known in the art.

Figure 2:
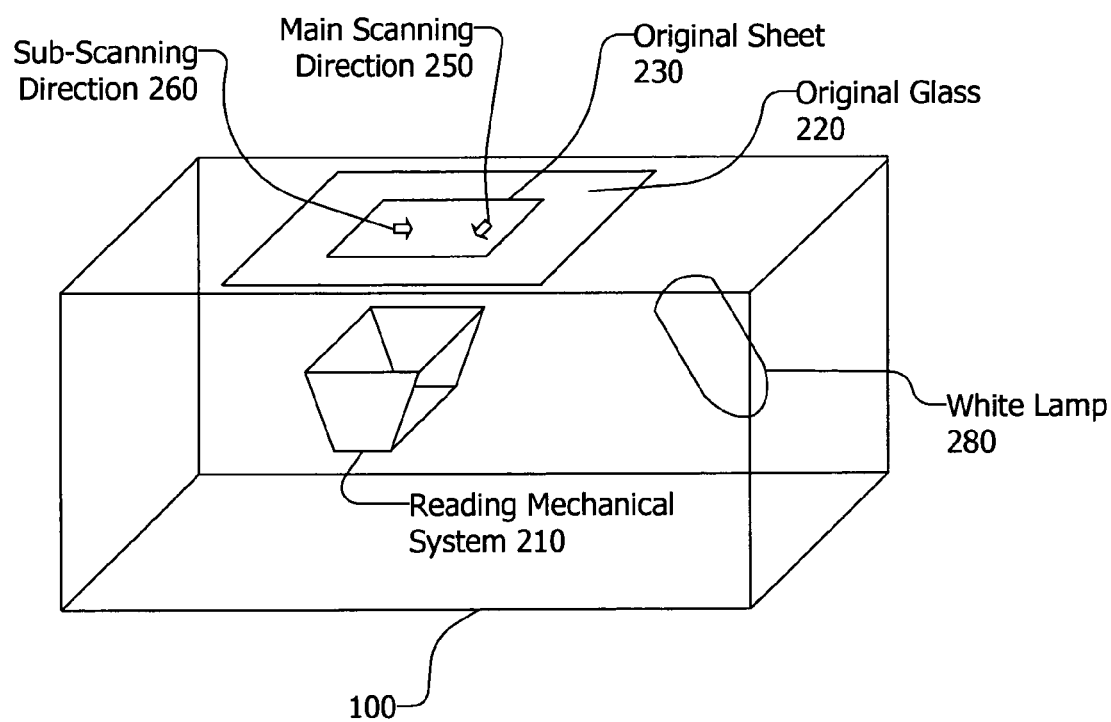
FIG. 2 is a partial cut-away side-view of the image forming apparatus of FIG. 1.

Referring now to FIG. 2 there is shown a partial cut-away side-view of the image forming apparatus 100 of FIG. 1 having an original sheet (e.g., of paper) 230 disposed on an original glass 220. The image forming apparatus 100 further includes a reading mechanical system 210 and a white lamp 280. The white lamp 280 is disposed opposite the original glass 220 from the original sheet 220.

The original sheet 230 may have an image disposed thereon, such as text or graphics. The original sheet 230 is moved onto the original glass 220. The white lamp 280 illuminates the original sheet 230. The reading mechanical system 210 generates signals corresponding to the image on the original sheet 230.

To generate signals for the entire image on the original sheet 230, there may be a scanning process. For example, the reading mechanical system 210 may scan the original sheet 230 one line at a time. The reading mechanical system 210 may include a one-dimensional image sensor unit. By using a two-dimensional image sensor unit in the reading mechanical system 210, it may be possible to scan images on the original sheet 230 with no or little movement. Furthermore, multi-dimensional image sensor units may be provided, for example for scanning three dimensional and complex objects.

There may be a main scanning direction 250 and a sub-scanning direction 260. The main scanning direction 250 may follow the axial direction of a photosensitive drums (not shown) in the image forming apparatus 100. The sub-scanning direction 260 may follow the rotation direction of the photosensitive drums, and may be perpendicular to the main scanning direction 250. The original sheet 230, reading mechanical system 210 and/or intermediate optics may have mechanical motion to allow complete scanning. Thus, there may be mechanical motion in the main scanning direction 250 and in the sub-scanning direction 260. This motion may be by the entire reading mechanical system 210 or by one or more parts. This motion may be at one or more fixed or variable speeds.

Where the image reading apparatus is other than an image forming apparatus, the image reading apparatus may be used for reading an image of a solid or flat object. The solid or flat object may be located proximate the image reading apparatus or a distance from the image reading apparatus. The image reading apparatus may include a light source, such as the white lamp 280 of the image forming apparatus 100. Alternatively, the object may be illuminated from an external light source or ambient light.

(A) FIRST EMBODIMENT

A-1 Constitution of the First Embodiment

Figure 3:
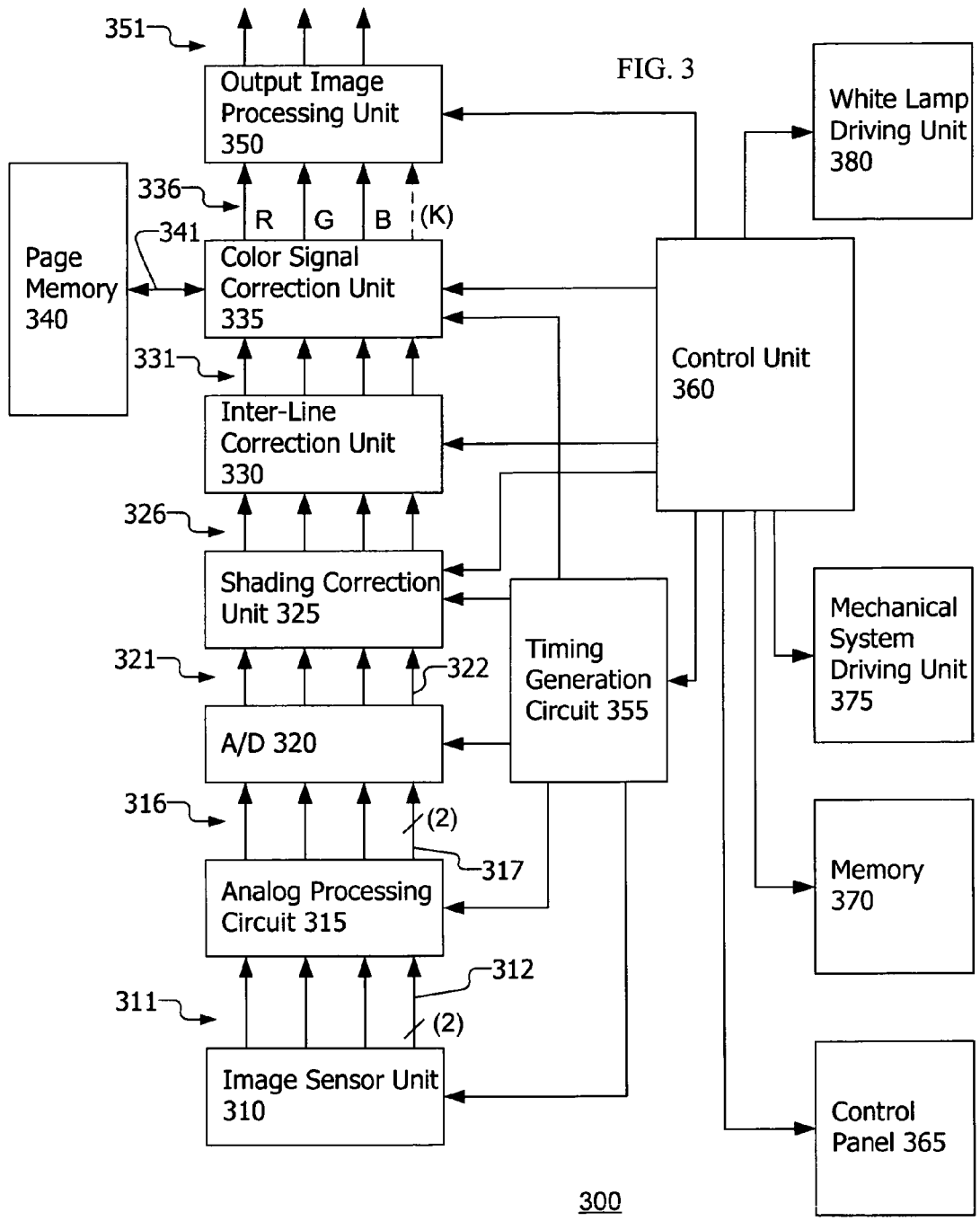
FIG. 3 is a block diagram of an image reading apparatus in accordance with the invention.

Referring now to FIG. 3 there is shown a block diagram of an image reading apparatus 300 in accordance with one aspect of the invention. The image reading apparatus 300 includes portions designed for image processing and portions designed for control. The image processing portions include an image sensor unit 310, an analog processing unit 315, an analog-to-digital conversion circuit (ADC) 320, a shading correction unit 325, an inter-line correction circuit 330, a color signal correction unit 335, a page memory 340, and an output image processing unit 350. The control portions include a timing generation circuit 355, a control unit 360, a memory 370, a control panel 365, a mechanical system driving unit 375 and a white lamp driving unit 380.

The image reading apparatus 300 includes hardware and may include software, altogether for providing the functionality and features described below. The image reading apparatus 300 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the image reading apparatus 300 may include various specialized units, circuits, software and interfaces for providing the functionality and features described below.

The image sensor unit 310 may generate color signals and monochrome signals and output them on color channels 311 and monochrome channels 312. The image sensor unit 310 may be included in the reading mechanical system 210 (FIG. 2). The image sensor unit 310 may be or include a 4-line CCD or other arrays of photodiodes. The color signals may be formed in one channel for each color, for example each of the three primary colors R, G and B. The monochrome signals may be formed in two monochrome channels. The color signals and the monochrome signals may be output simultaneously, for example, in parallel, or they may be switched. The image sensor unit 310 may be embodied as one or more integrated circuit chips. The image sensor unit 310 may include or be used in conjunction with color filters arranged with respect to the CCDs for each color.

As used herein, a "charge-coupled device" or "CCD" is a light-sensitive integrated circuit that produces and stores (generally temporarily) electric charges representing light levels to which the CCD is exposed. A CCD may be formed of an array of photodiodes to thereby provide a representation of an image to which the CCD is exposed. The array may be one- or multi-dimensional. A "photodiode" is a semiconductor diode that generates an electric signal when exposed to light. The photodiodes of a CCD may have particular sensitivities, such as for particular light frequencies or levels.

The analog processing unit 315 receives the color signals on the color channels 311 and the monochrome signals on the monochrome channels 312. The analog processing unit 315 processes the color and monochrome signals from the image sensor unit 310 so that they are suitable for conversion to digital signals. The analog processing unit 315 may perform such processing as level shifting, removal of nozzle component, and amplification. To perform this processing, the analog processing unit 315 may include one or more of: a coupling capacitor, a correlated double-sampling (CDS) circuit, a sample and hold circuit, a gain amplifier and an offset removal circuit. The analog processing unit 315 outputs the processed color signals on the color channels 316 and the monochrome signals on the monochrome channels 317.

The ADC 320 receives the processed color signals on the color channels 316 and the monochrome signals on the monochrome channels 317. The ADC 320 converts the processed color and monochrome signals into digital signals for output on channels 321. The ADC 320 also merges the two analog monochrome signals into a single digital monochrome signal for output on a channel 322.

The shading correction unit 325 receives the digital signals from ADC 320 on the channels 321, 322. The shading correction unit 325 corrects the digital signals for variations of sensitivity of the photodiodes in the image sensor unit 310 and illumination. There may be variations in the illumination of the object, and it may be desirable to correct for these variations, especially in the main scanning direction 250. The shading correction unit 325 outputs signals on channels 326, wherein there may be one channel each for the three primary colors and monochrome.

The arrays of photodiodes in the image sensor unit 310 may have differences in position which can give rise to misalignment of the read image. The inter-line correction circuit 330 corrects the color and monochrome signals for these differences in position. The inter-line correction circuit 330 receives signals on the channels 326 and outputs signals on the channels 331.

The inter-line correction circuit 330 may have a second function. While one color output is carried out (in correspondence to one line), the monochrome outputs may be carried out twice (in correspondence to two lines). The inter-line correction circuit 330 may perform an interpolation process—doubling the number of lines (i.e., the resolution) in the sub-scanning direction 260 for the color output. This interpolation process, for example, can set the average of signals on respective upper and lower scanned lines to a signal on a line in an intermediate position (virtual position) thereof.

The color signal correction unit 335 may be used when the image reading apparatus is used in the color imaging mode. The color signal correction unit 335 enhances the resolution of the read color image by using information in the monochrome signals. For example, the color signal correction unit 335 may convert a signal of 300 dpi to a signal of 600 dpi. The color signal correction unit 335 receives color signals and the monochrome signals from the inter-line correction circuit 330 on the channels 331. The color signal correction unit 335 outputs color and monochrome signals on channels 336.

The page memory 340 may store the read image signals, which the page memory 340 may receive from the color signal correction unit 335 via channel 341. In color imaging mode, the page memory 340 may store corrected read image signals. In monochrome mode, the page memory 340 may store uncorrected read image signals.

The output image processing unit 350 provides the final image output of the image reading apparatus 300. The output image processing unit 350 is an interface to an output destination, and may convert signals according to the needs of the output destination. For example, the output image processing unit 350 may change the range of a gamma control according to devices such as display or printer. The output image processing unit 350 receives color and monochrome signals on channels 336 and outputs processed signals on channels 351. Although the color and monochrome signals received by the output image processing unit 350 come from the color signal correction unit 335, these signals may be obtained directly from the color signal correction unit 335 or indirectly from the page memory 340.

The timing generation circuit 355, under the control of the control unit 360, generates and gives timing signals for the image sensor unit 310, the analog processing unit 315, the ADC 320, the shading correction unit 325, the inter-line correction circuit 330, the color signal correction unit 335 and the page memory 340.

The control unit 360 may control the image reading apparatus 300 according to programs and data stored in the memory 370. The control unit may use the memory 370 as a working memory.

The memory 370 provides long term and short term storage of data and programs for the image reading apparatus 300. The memory 370 may be combined with the page memory 340. In some embodiments, the memory 370 is not expandable or may be difficult to expand, whereas the page memory 340 may be designed for expandability.

The control panel 365 receives input information by a user. This input information may include the operation mode (e.g., color or monochrome mode) and a selected number of printing sheets of paper.

The mechanical system driving unit 375 operates under control of the control unit 360. The mechanical system driving unit 375 drives a moving mechanism in the sub-scanning direction 260. The moving speed of the moving mechanism in the sub-scanning direction 260 may be the same in color mode and monochrome mode. In such a case, the mechanical system driving unit 375 performs the driving operation without distinction of the color mode and monochrome mode.

The white lamp driving unit 380 drives a white lamp, which may irradiate white light to an object such as a document. The white lamp driving unit 380 operates under the control of the control unit 360.

Figure 4:
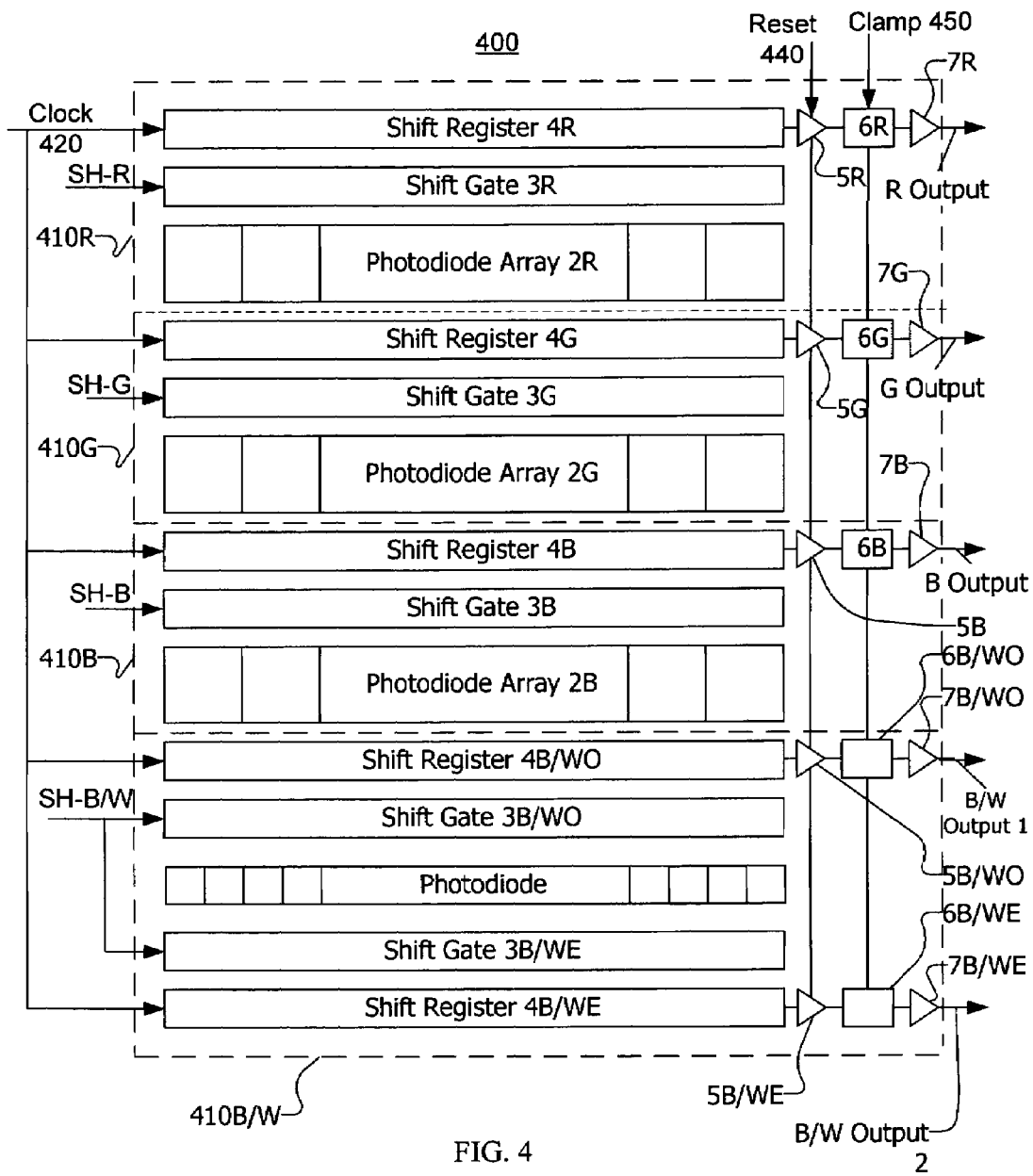
FIG. 4 is a block diagram of an image sensor unit of the first embodiment.

Referring now to FIG. 4, there is shown a block diagram of an image sensor unit 400 of a first embodiment of the invention. The image sensor unit 400 may be used as the image sensor unit 310. The image sensor unit 400 is of the 4-line type, and includes three photoelectric converters 410R, 410G, 410B for color and one photoelectric converter 410B/W for monochrome. The letters R, G, B and B/W refer to the respective color: red, green, blue or monochrome (black/white).

The photoelectric converters 410R, 410G, 410B, 410B/W each have a single linear (one-dimensional) photodiode array 2R, 2G, 2B, 2B/W, comprising a number of photodiodes. Each photodiode of the photodiode arrays 2R, 2G, 2B, 2B/W has a sequential reference number from some arbitrary starting point in the respective array. Accordingly, based upon its reference number, a photodiode may be referred to as "odd" or "even." Those elements whose reference number ends in "O" process the stored charges of the odd-numbered photodiodes and those elements whose numeral ends in "E" process the stored charges of the even-numbered photodiodes.

The photodiodes of the photodiode arrays 2R, 2G, 2B, 2B/W may be arranged in the main scanning direction 250. The photodiodes store (photoelectrically convert) charges according to a received quantity of light. The photodiodes may be adapted to be sensitive to predetermined frequencies.

The color photoelectric converters 410R, 410G, 410B respectively have: shift gates 3R, 3G, 3B; shift registers 4R, 4G, 4B; reset gates 5R, 5G, 5B; clamp circuits 6R, 6G, 6B; and amplifiers 7R, 7G, 7B.

The monochrome photoelectric converter 410B/W has two channels, referred to herein as "odd" and "even." The monochrome photoelectric converter 410B/W includes two shift gates 3B/WO, 3B/WE; two shift registers 4B/WO, 4B/WE; two reset gates 5B/WO, 5B/WE; two clamp circuits 6B/WO, 6B/WE; and two amplifiers 7B/WO, 7B/WE.

The stored charges of the photodiode arrays 2R, 2G, 2B are shifted to the corresponding shift registers 4R, 4G, 4B via the shift gates 3R, 3G, 3B which are put into an open state according to shift signals SH-R, SH-G, SH-B. The stored charges of the photodiode arrays 2B/WO, 2B/WE are shifted to the corresponding shift registers 4B/WO, 4B/WE via the shift gates 3B/WO, 3B/WE which are put into an open state according to shift signal SH-B/W. The shift signals SH-R, SH-G, and SH-B may be the same. The shift signal SH-B/W may have a cycle which is ½ of the cycle of the shift signals SH-R, SH-G, SH-B. The shift registers 4R, 4G, 4B, 4B/W may be CCD analog shift registers.

To the respective shift registers 4R, 4G, 4B, 4B/WO, 4B/WE the stored charges of the photodiode arrays 2R, 2G, 2B, 2B/WO, 2B/WE are shifted at predetermined timing. The respective shift registers 4R, 4G, 4B, 4B/WO, 4B/WE may output the shifted stored charges as respective serial signals (a one-dimensional image signal) according to a single clock signal 420. In this case, in order to prevent the output signals from interfering, a reset signal 440 may be provided via the reset gates 5R, 5G, 5B, 5B/WO, 5B/WE. Thereafter, the output signals are clamped by the clamp circuits 6R, 6G, 6B, 6B/WO, 6B/WE and moreover amplified and outputted by the corresponding amplifiers 7R, 7G, 7B, 7B/WO, 7B/WE.

Figure 5:
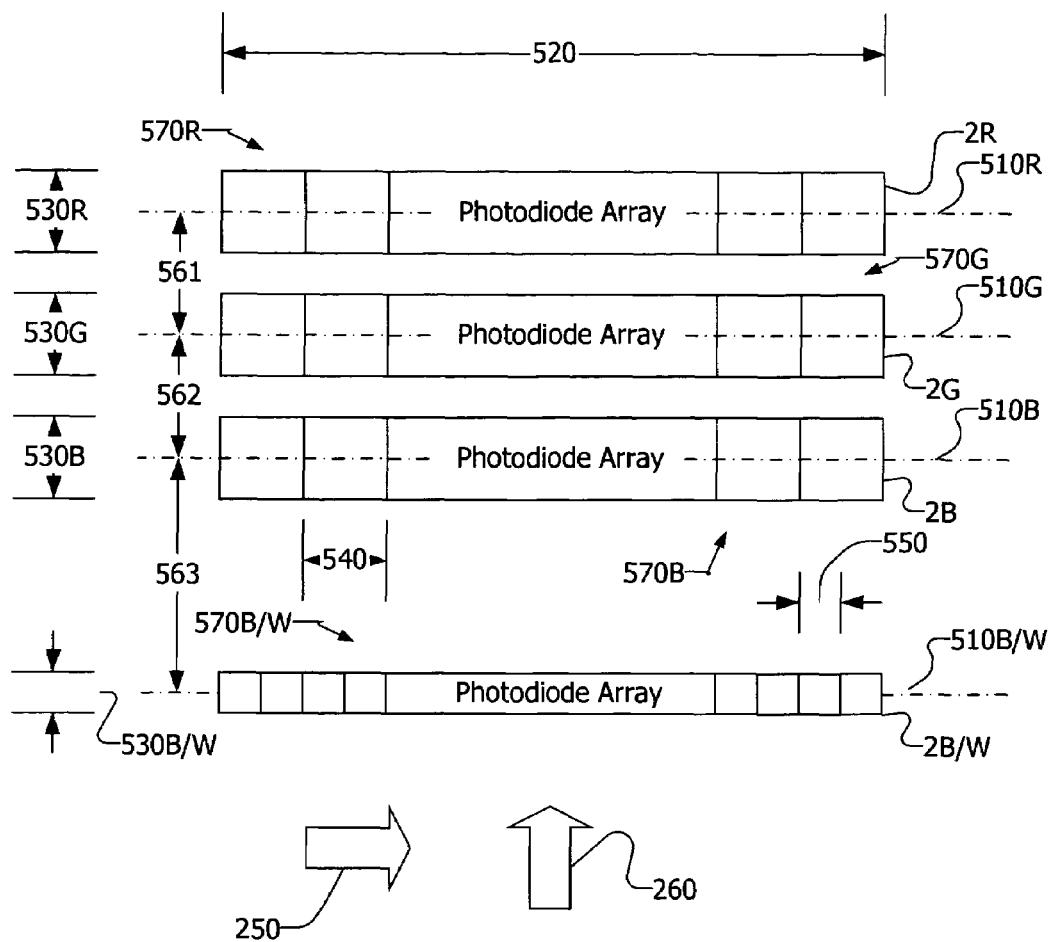
FIG. 5 is an illustration for an arrangement of photodiode arrays of the first embodiment.

Referring now to FIG. 5, there is shown a diagram of the photodiode arrays 2R, 2G, 2B, 2B/W of the first embodiment. The photodiode arrays 2R, 2G, 2B, 2B/W may be rectilinear and have a uniform length 520. The photodiode arrays 2R, 2G, 2B, 2B/W may have respective widths 530R, 530G, 530B, 530B/W. The order of the four kinds of photodiode arrays 2R, 2G, 2B, 2B/W in the sub-scanning direction 260 is optional. However, to obtain better balance of the three color outputs (R Output, G Output, B Output), the monochrome photodiode array 2B/W may be positioned at an end (on the uppermost part or lowermost part shown in FIG. 4) of the photodiode arrays 2R, 2G, 2B instead of between them. FIG. 4 shows a case that the monochrome photodiode array 2B/W is in the lowermost position.

For each photodiode array 2R, 2G, 2B, 2B/W, there maybe defined a respective center line 510R, 510G, 510B, 510B/W. The photodiode arrays 2R, 2G, 2B, 2B/W may be aligned in the main scanning direction 250, such that the center lines 510R, 510G, 510B, 510B/W are parallel to the main scanning direction 250.

The photodiode arrays 2R, 2G, 2B, 2B/W may be spaced at respective intervals 561, 562, 563, and disposed in positions relative one another as shown. In the sub-scanning direction 260, the intervals between the center lines 510R, 510G, 510B, 510B/W may be an integral multiple of the reading pitch. The reading pitch may be determined by the product of the moving speed of a carriage of a scanner in the reading mechanical system 260 (FIG. 2) and the period of time of SH-R, SH-G, SH-B, and SH-B/W.

As shown in the figures, the photodiode arrays 2R, 2G, 2B, 2B/W include a number of photodiodes 570R, 570G, 570B, 570B/W, each corresponding to a pixel. (Although the figures may appear to show the photodiode arrays each having a large central portion, this is intended to represent an undefined number of photodiodes.) The photodiodes 570R, 570G, 570B, 570B/W have respective light receiving surfaces. The light receiving surfaces of the color photodiodes 570R, 570G, 570B may have uniform height 530R, 530G, 530B. The individual light receiving surfaces of the monochrome photodiodes 570B/W may have a uniform height 530B/W.

The light receiving surfaces of each respective photodiode 570R, 570G, 570B, 570B/W have a size and shape. The light receiving surfaces of the color photodiodes 570R, 570G, 570B may have a uniform width 540. The individual light receiving surfaces of the monochrome photodiodes 570B/W may have a uniform width 550. The size and shape of the light receiving area may be one determinant of a photodiode's sensitivity.

Each light receiving surface of the photodiodes 570R, 570G, 570B, 570B/W defines an area. In the first embodiment, the area of the monochrome photodiodes 570B/W is ¼ of the light receiving area of the color photodiodes 570R, 570G, 570B. The area of the color photodiodes 570R, 570G, 570B may be the same.

The light receiving surfaces of the photodiodes 570R, 570G, 570B, 570B/W may have the shape of a square. Accordingly, the width 540 may be twice the width 550, and the height 530R, 530G, 530B may be twice the height 530B/W. Therefore, there may be twice as many photodiodes in the monochrome photodiode array 2B/W as in any one of the color photodiode arrays 2R, 2G, 2B.

Because of the relative sizes of the areas of the photodiodes 570R, 570G, 570B, 570B/W and because of the timing of the output signals described with respect to FIG. 4, the resolution of the monochrome output signals B/W Output 1, B/W Output 2 is twice that of the color output signals R Output, G Output, B Output in both the main scanning direction 250 and the sub-scanning direction 260.

For example, consider an image reading apparatus wherein the number of photodiodes (i.e., pixels) of the monochrome photodiode array 2B/W is 7500. Such an embodiment is shown in the timing chart of FIG. 6. The stored charges of the 1st to 3750th color photodiodes 570R, 570G, 570B are sequentially output as signals R Output, G Output, B Output. The stored charges of the 1st, 3rd, - - - , and 7499th (odd numbered) photodiodes are sequentially output as B/W Output 1. The stored charges of the 2nd, 4th, - - - , and 7500th (even numbered) photodiodes are sequentially output as B/W Output 2. The monochrome shift signal SH-B/W may have a cycle which is ½ of the cycle of the color shift signals SH-R, SH-G, SH-B. Thus, at every other monochrome shift signal SH-B/W, there is no R Output, G Output, B Output.

Figure 7:
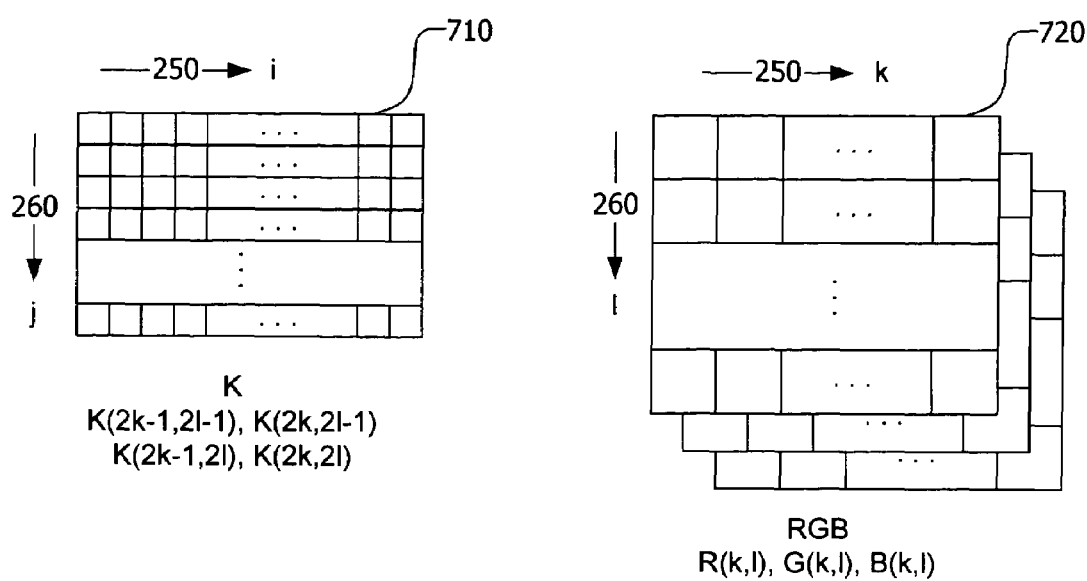
FIG. 7 shows an outline of a color scanning process of the first embodiment.

Referring now to FIG. 7, there is shown an outline of a color scanning process of the first embodiment. Despite the fact that the photodiode arrays 2R, 2G, 2B, 2B/W are linear and one-dimensional (in the main scanning direction 250), a two dimensional image is obtained by combining image data obtained along the sub-scanning direction 260 (e.g., raster scanned). Thus, the one-dimensional photodiode arrays 2R, 2G, 2B, 2B/W may be viewed as two-dimensional arrays 710, 720 each having a row dimension and a column dimension.

Because the monochrome photodiode array 2B/W is clocked at twice the rate of the color photodiode arrays 2R, 2G, 2B, the two-dimensional view 710 of the monochrome photodiode array 2B/W has twice as many rows as the two-dimensional view 720 of the color photodiode arrays 2R, 2G, 2B.

For convenience, the rows of the monochrome photodiode array 2B/W will be labeled with the variable "i" and the rows of color photodiode arrays 2R, 2G, 2B will be labeled with the variable "k". The columns of the color photodiode arrays 2R, 2G, 2B will be labeled with the variable "l". The columns of the monochrome photodiode array 2B/W will be labeled with the variable "j". Each pixel of the pixel data is identified by a row and column position, wherein the row corresponds to the main scanning direction 250, and the column corresponds to the sub-scanning direction 260.

The monochrome pixel data is referred to as K and individual pixel data is referred to by row, column as K(i, j). Likewise, the color pixel data is referred to as R(k, l), G(k, l), and B(k, l). Because the monochrome pixels are half as wide and half as high as the color pixels, for each color pixel R(k, l), G(k, l), and B(k, l) there are four monochrome pixels, at K(2k, 2l-1), K(2k-1, 2l-1), K(2k, 2l) and K(2k-1, 2l). The monochrome pixels at K(2k, 2l-1) and K(2k-1, 2l-1) may be considered on odd-numbered lines. The monochrome pixels at K(2k, 2l) and K(2k-1, 2l) may be considered on even-numbered lines.

Figure 8:
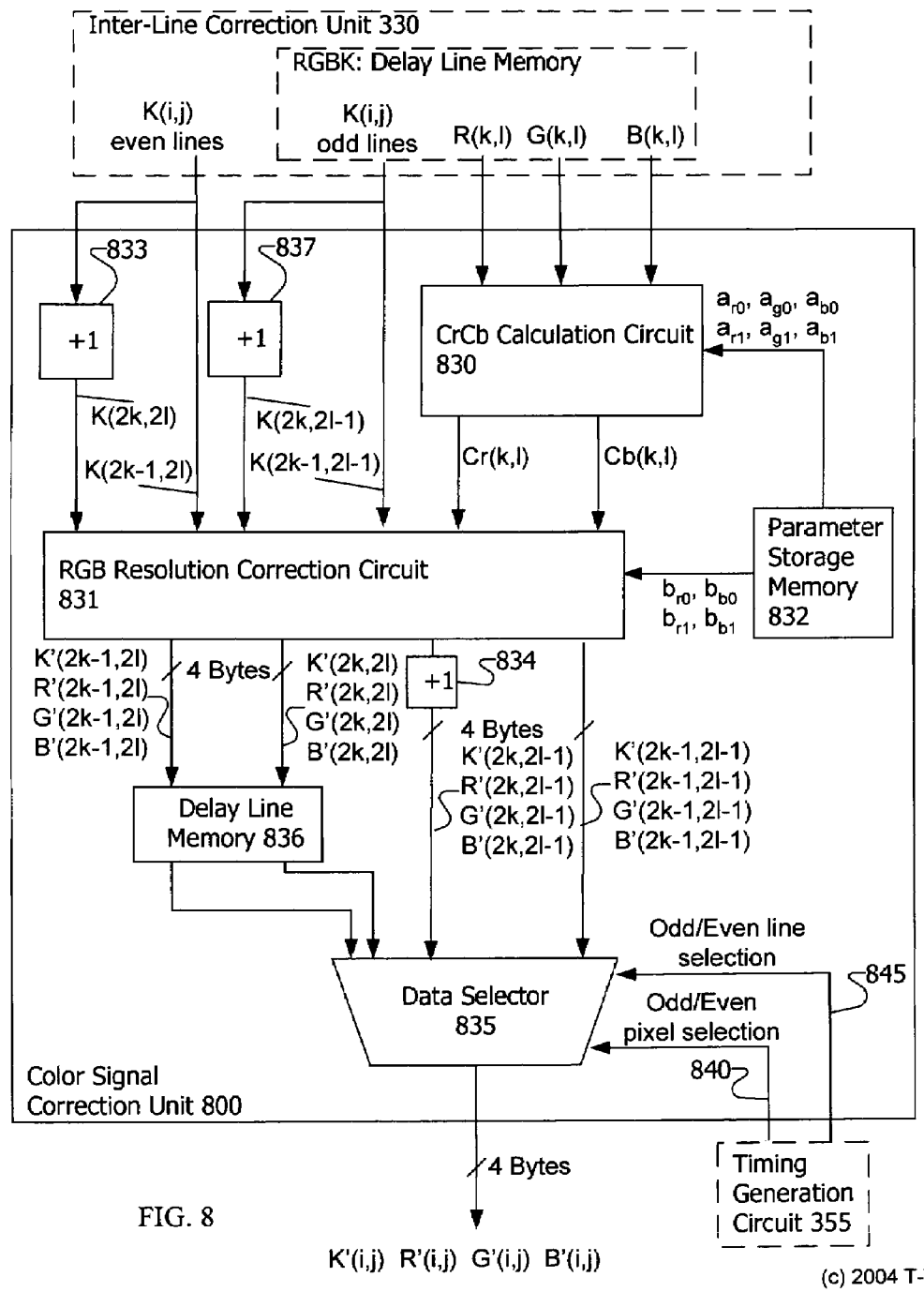
FIG. 8 is a block diagram of a color signal correction unit of the first embodiment.

Referring now to FIG. 8, there is shown a block diagram of a color signal correction unit 800 of the first embodiment. The color signal correction unit 835 has a CrCb calculation circuit 830, an RGB resolution correction circuit 831, a parameter storage memory 832, three one-pixel delay buffers 833, 834, 837, a delay line memory 836, and a data selector 835. Before correction by the color signal correction unit 800, the number of pixels in the sub-scanning direction 260 is of the monochrome data is twice that of the color data, and the number of pixels in the main scanning direction 250 of the monochrome data is twice that of the color data. The color signal correction unit 800 uses information in the monochrome signals to enhance the color signals. Thus, the color signal correction unit 800 may output color signals having the same number of pixels as the monochrome signals in both the main scanning direction 250 and the sub-scanning direction 260.

As shown at the top of FIG. 8, the color pixel data R(k, l), G(k, l), B(k, l), the even channels of the monochrome pixel data K(2k, 2l-1) (odd lines), K(2k, 2l) (even lines) and the odd channel of the monochrome pixel data K(2k-1, 2l-1) (odd lines), K(2k-1, 2l) (even lines) may be input at the same time to the color signal correction unit 335.

The CrCb calculation circuit 830 and the one-pixel delay buffers 833, 837 perform a YCrCb conversion indicated in Formulas (1) to (6). Namely, they produce a brightness signal (Y), a first color difference signal (Cr=R−Y), and a second color difference signal (Cb =B−Y).

Figure 6:
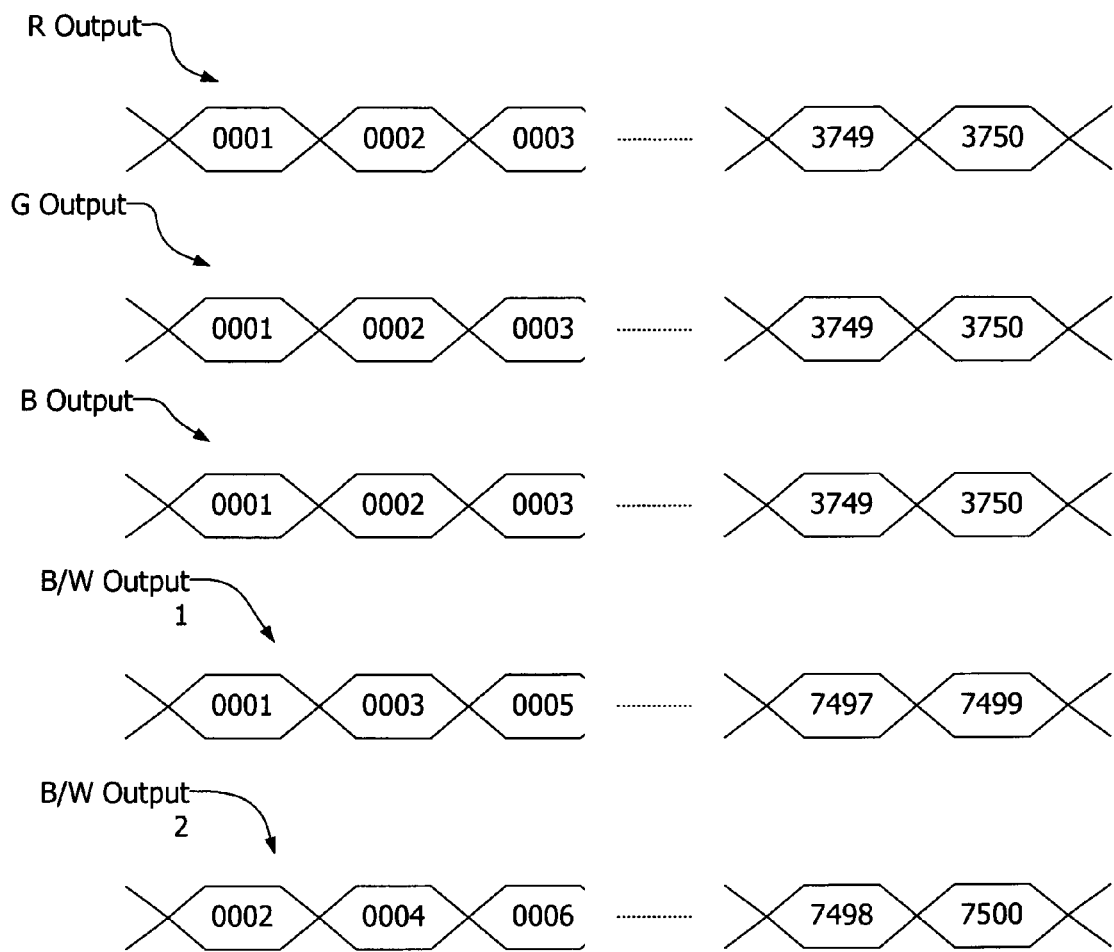
FIG. 6 is a timing chart showing the outline of output from the image sensor unit of the first embodiment.

The monochrome signal K can be directly used as the brightness signal Y. As shown in FIG. 6, the monochrome signal K has signals for the even-numbered pixels and signals for the odd-numbered pixels. The odd channel of the odd lines of the input monochrome signal K(i, j)=K(2k-1, 2l-1). The even channel of the odd lines of the input monochrome signal K(i, j)=K(2k, 2l-1). The odd channel of the even lines of the input monochrome signal K(i, j)=K(2k-1, 2l). The even channel of the even lines of the input monochrome signal K(i, j)=K(2k, 2l). These four signals satisfy Formulas (1) through (4) for the brightness signals. The odd channel signals are input directly to the RGB resolution correction circuit 831. The even channel signals are delayed by a one-pixel period via the one-pixel delay buffers 833, 837 and then input to the RGB resolution correction circuit 831. This delay results in the even channel signals being interleaved with the odd channel signals as input to the RGB resolution correction circuit 831.

$$Y(2k-1, 2l-1)=K(2k-1, 2l-1) \quad (1)$$

$$Y(2k, 2l-1)=K(2k, 2l-1) \quad (2)$$

$$Y(2k-1, 2l)=K(2k-1, 2l) \quad (3)$$

$$Y(2k, 2l)=K(2k, 2l) \quad (4)$$

The parameter storage memory 832 stores parameters, including $a_{r0}$, $a_{g0}$, $a_{b0}$, $a_{r1}$, $a_{g1}$, $a_{b1}$, $b_{r0}$, $b_{g0}$, $b_{b0}$, $b_{r1}$, $b_{g1}$, and $b_{b1}$. These parameters are determined by the characteristics of the CCD and light source.

The first color difference signal Cr and the second color difference signal Cb can be obtained from the color signals R, G, B even if there is no brightness signal Y. This is shown in Formulas (5) and (6). The CrCb calculation circuit 830 calculates Formulas (5) and (6) using the parameters $a_{r0}$, $a_{g0}$, $a_{b0}$, $a_{r1}$, $a_{g1}$, and $a_{b1}$, thereby obtaining the pixel data Cr(k, j) of the first color difference signal and the pixel data Cb(k, j) of the second color difference signal. The CrCb calculation circuit 830 inputs the pixel data Cr(k, j), Cb(k, j) to the RGB resolution correction circuit 831.

$$Cr(k, l)=a_{r0}R(k, l)+a_{g0}G(k, l)+a_{b0}B(k, l) \quad (5)$$

$$Cb(k, l)=a_{r1}R(k, l)+a_{g1}G(k, l)+a_{b1}B(k, l) \quad (6)$$

The RGB resolution correction circuit 831 executes the RGB reverse conversion using Formulas (7) to (18) and obtains three primary colors R', G', B' with increased resolution (the number of pixels) in the main scanning direction 250. The RGB resolution correction circuit 831 obtains the parameters $b_{r0}$, $b_{g0}$, $b_{b0}$, $b_{r1}$, $b_{g1}$, and $b_{b1}$ from the parameter storage memory 832.

$$R'(2k-1, 2l-1)=Y(2k-1, 2l-1)+b_{r0}Cr(k, l) \quad (7)$$

$$G'(2k-1, 2l-1)=Y(2k-1, 2l-1)-b_{r1}Cr(k, l)+b_{b0}Cb(k, l) \quad (8)$$

$$B'(2k-1, 2l-1)=Y(2k-1, 2l-1)+b_{b1}Cb(k, l) \quad (9)$$

$$R'(2k, 2l-1)=Y(2k, 2l-1)+b_{r0}Cr(k, l) \quad (10)$$

$$G'(2k, 2l-1)=Y(2k, 2l-1)-b_{r1}Cr(k, l)+b_{b0}Cb(k, l) \quad (11)$$

$$B'(2k, 2l-1)=Y(2k, 2l-1)+b_{b1}Cb(k, l) \quad (12)$$

$$R'(2k-1, 2l)=Y(2k-1, 2l)+b_{r0}Cr(k, l) \quad (13)$$

$$G'(2k-1, 2l)=Y(2k-1, 2l)-b_{r1}Cr(k, l)+b_{b0}Cb(k, l) \quad (14)$$

$$B'(2k-1, 2l)=Y(2k-1, 2l)+b_{b1}Cb(k, l) \quad (15)$$

$$R'(2k, 2l)=Y(2k, 2l)+b_{r0}Cr(k, l) \quad (16)$$

$$G'(2k, 2l)=Y(2k, 2l)-b_{r1}Cr(k, l)+b_{b0}Cb(k, l) \quad (17)$$

$$B'(2k, 2l)=Y(2k, 2l)+b_{b1}Cb(k, l) \quad (18)$$

The brightness signal Y, the first color difference signal Cr, and the second color difference signal Cb can be converted to the three primary color signals R', G', B'. In the first embodiment, the number of pixels of the brightness signal Y in the main scanning direction 250 is twice the number of pixels of the first color difference signal Cr and the second color difference signal Cb in the main scanning direction 250. After conversion, the number of pixels of the color signals R', G', B' in the main scanning direction 250 is the same as the number of pixels of the brightness signal Y before conversion.

Formulas (7) to (9) and (13-15) are expressions of data at the even pixel positions of the color signals R', G', B' after conversion. Formulas (10) to (12) and (16) to (18) are expressions of data at the odd pixel positions of the color signals R', G', B' after conversion. The RGB resolution correction circuit 831 calculates Formulas (7) to (9) and (13-15) almost in parallel using the parameters $b_{r0}$, $b_{r1}$, $b_{b0}$, and $b_{b1}$ obtained from the parameter storage memory 832.

The four outputs of the RGB resolution correction circuit 831 may be treated differently. The RGB resolution correction circuit 831 gives the color signals R'(2k–1, 2l–1), G'(2k–1, 2l–1), B'(2k–1, 2l–1) at the odd line and odd pixel positions to the data selector 835 as a first selection input. The RGB resolution correction circuit 831 gives the color signals R'(2k, 2l–1), G'(2k, 2l–1), B'(2k, 2l–1) at the odd line and even pixel positions to the delay buffer 834. The delay buffer 834 adds a one-pixel delay and gives the signals to the data selector 835 as a second selection input. The RGB resolution correction circuit 831 gives the color signals R'(2k–1, 2l), G'(2k–1, 2l), B'(2k–1, 2l) at the even line and odd pixel positions, and the color signals R'(2k, 2l), G'(2k, 2l), B'(2k, 2l) at the even line and even pixel positions, to the delay line memory 836. The delay line memory 836 adds a one line delay and then feeds the signals to the data selector 835. As a result, the four signal are synchronized at the data selector 835.

Further, FIG. 8 shows a case that even in the color mode, the brightness signal (that is, the monochrome signal K'(i, j) ) is output from the color signal correction unit 335.

The data selector 835, according to an odd/even line discrimination signal 845 and an odd/even pixel discrimination signal 840 from the timing generation circuit 335, selects and outputs R'(i, j), G'(i, j), B'(i, j).

A-2 Operation of the First Embodiment

In the image reading apparatus 300 shown in FIG. 3, the control unit 360, upon receipt of an instruction of document reading in the color mode from the control panel 365, turns on the white lamp 380, drives the reading mechanical system by the driving unit 375, and indirectly or directly starts the electrical processing system such as the image sensor unit 310, the analog processing unit 315, the A-D conversion circuit 320, the shading correction unit 325, the inter-line correction circuit 330, the color signal correction unit 335, and the page memory 340 via the timing generation circuit 355.

Further, the moving speed of the reading mechanical system 210 in the sub-scanning direction 260 in the color mode may be the same as that in the monochrome mode.

Figure 9:
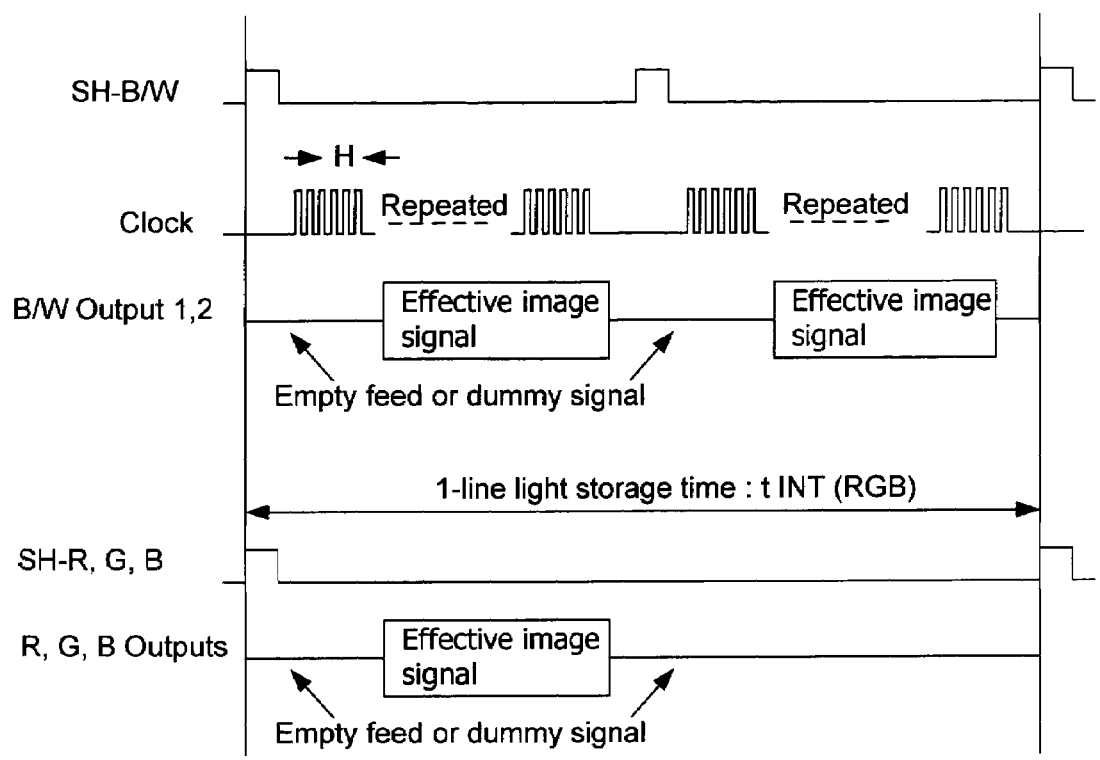
FIG. 9 is a first timing chart showing the operation of the image sensor unit of the first embodiment.

Referring now to FIG. 9, there is shown a first timing chart showing the operation of the image sensor unit 400. In the image sensor unit 400, the charges stored in the photodiode arrays 2R, 2G, 2B are shifted to the shift registers 4R, 4G, 4B according to the shift instruction signals SH-R, SH-G, SH-B. During the period of next photoelectric conversion and charge storage of the photodiode arrays 2R, 2G, 2B, the stored charges are serially output from the shift registers 4R, 4G, 4B according to the clock signal 420. The stored charges then are given to the analog processing unit 315 sequentially via the reset gates 5R, SG, SB, the clamp circuits 6R, 6G, 6B, and the amplifiers 7R, 7G, 7B.

Figure 10:
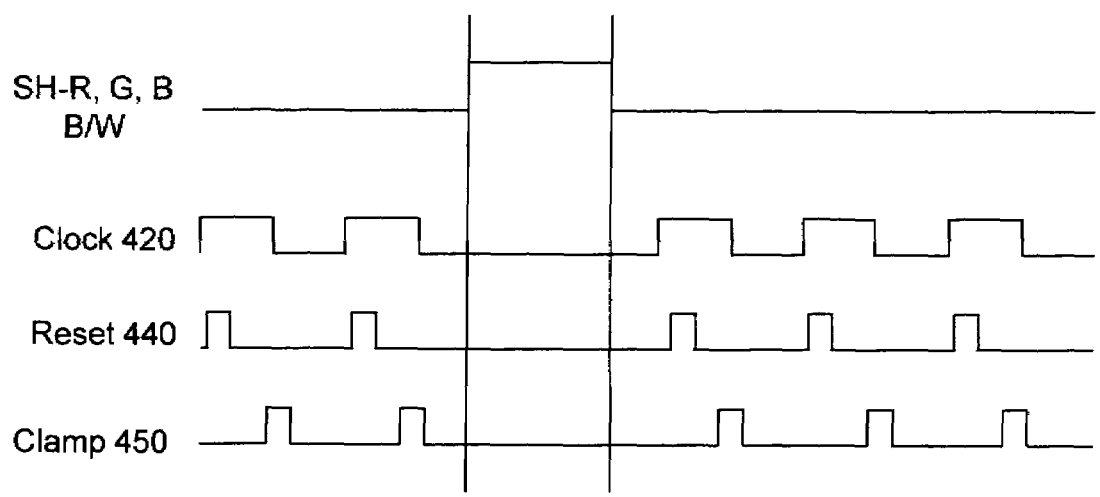
FIG. 10 is a second timing chart showing the operation of the image sensor unit of the first embodiment.

Referring now to FIG. 10, there is shown a second timing chart showing the operation of the image sensor unit 400. The reset signal 440 is given to the reset gates SR, SG, SB during the first half of the significant pulse period of the clock signal 420. This separates the inter-pixel signals. The clamp signal 450 is given to the clamp circuits 6R, 6G, 6B during the second half of the significant pulse period of the clock signal 420, and the read pixel signals are clamped.

The charges stored in the monochrome photodiode array 2B/W are shifted to the shift registers 4B/WO, 4B/WE according to the shift instruction signal SH-B/W. During the period of next photoelectric conversion and charge storage of the photodiode array 2B/W, the charges are serially output from the shift registers 4B/WO, 4B/WE according to the clock signal 420. The charges are then given respectively to the analog processing unit 315 sequentially via the reset gates 5B/WO, 5B/WE, the clamp circuits 6B/WO, 6B/WE, and the amplifiers 7B/WO, 7B/WE.

The shift instruction signal SH-B/W may have a cycle which is ½ of the cycle of the color shift instruction signals SH-R, SH-G, SH-B. As shown in FIG. 9, when the monochrome output signals B/W Output 1, B/W Output 2 are output in the sub-scanning direction 260 in correspondence to two lines, the color output signals R Output, G Output, B Output are output in the sub-scanning direction 260 in correspondence to one line.

As mentioned above, the output signals R Output, G Output, B Output, B/W Output 1, B/W Output 2 are subject to level shift, noise removal, and amplification by the analog processing unit 315 and then converted to digital signals 321, 322 by the A-D conversion circuit 320. Further, the two monochrome signals B/W Output 1, B/W Output 2 are also unified to a 1-channel signal 322. Thereafter, the signals are subject to shading correction for illumination variations by the shading correction unit 325.

The inter-line correction circuit 330 converts the signals 326 to signals fit to the three-primary colors R, G, B and monochrome lines, in consideration of different positions of the photodiode arrays 2R, 2G, 2B, 2B/W in the sub-scanning direction 260. The inter-line correction circuit 330 also may convert the color signals to double density signals in the sub-scanning direction 260.

The color signals from the color signal correction unit 335 are stored once in the page memory 340 and then read or directly given to the output image processing unit 350, subject to the image process according to the output form, and outputted from the image reading apparatus 300.

The image reading operation in the monochrome mode, even if a color signal is output from the image sensor unit 310, effectively functions only the processing system for a monochrome signal.

A-3 Effects of the First Embodiment

Color filters may damp the amount of light received by the color arrays. In the image sensor unit 310 of the first embodiment, the light receiving area of the photodiodes of the color arrays 2R, 2G, 2B is made wider than the light receiving area of the photodiodes of the monochrome array 2B/W. As a result, despite the damped light, good resolution may be obtained. Despite the increased width, the image sensor unit 310 is simple and compact. As a result, a decrease in cost can be obtained.

By including the monochrome photodiode array 2B/W, image quality in monochrome mode is also good.

Furthermore, the light receiving area of each color photodiode is wide, so that even if the process is performed at a speed in the sub-scanning direction 260 in color mode which is equal to the speed in the sub-scanning direction 260 in monochrome mode, the reduction in the color image quality can be minimized. This matter (single speed) means that the moving mechanism in the sub-scanning direction 260 and the driving unit therefore can be simplified.

Such an image quality reduction due to the same speed can be corrected by the correction processes of the inter-line correction circuit 330 and the color signal correction unit 335. Thus, a sufficiently good color image quality can be obtained. Particularly, the color signal correction unit 335 adopts a new idea of using, for correction of a color signal, information of a monochrome signal having a higher resolution than that of the color signal.

Furthermore, the light receiving area of each color photodiode is wide and moreover the aforementioned correction process by the color signal correction unit 335 is performed. When an automatic document feeder (ADF) is used, paper moves across the glass, and the paper may incline, bend or detach from the original glass 220 (FIG. 2). As might be expected, these deviations may easily cause deviation in the image scan quality, such as differences amongst and amid the color signals 311 and monochrome signals 312 (FIG. 3). However, by increasing the light receiving area of each color photodiode, the influence of the deviations will be decreased, so that an improvement of the color through-pass read characteristic can be expected.

(B) SECOND EMBODIMENT

Next, the second embodiment of the image sensor unit and image reading apparatus of the present invention will be explained briefly with reference to the accompanying drawings. The image sensor unit and image reading apparatus of the second embodiment will be explained hereunder centering on the differences from those of the first embodiment.

Figure 11:
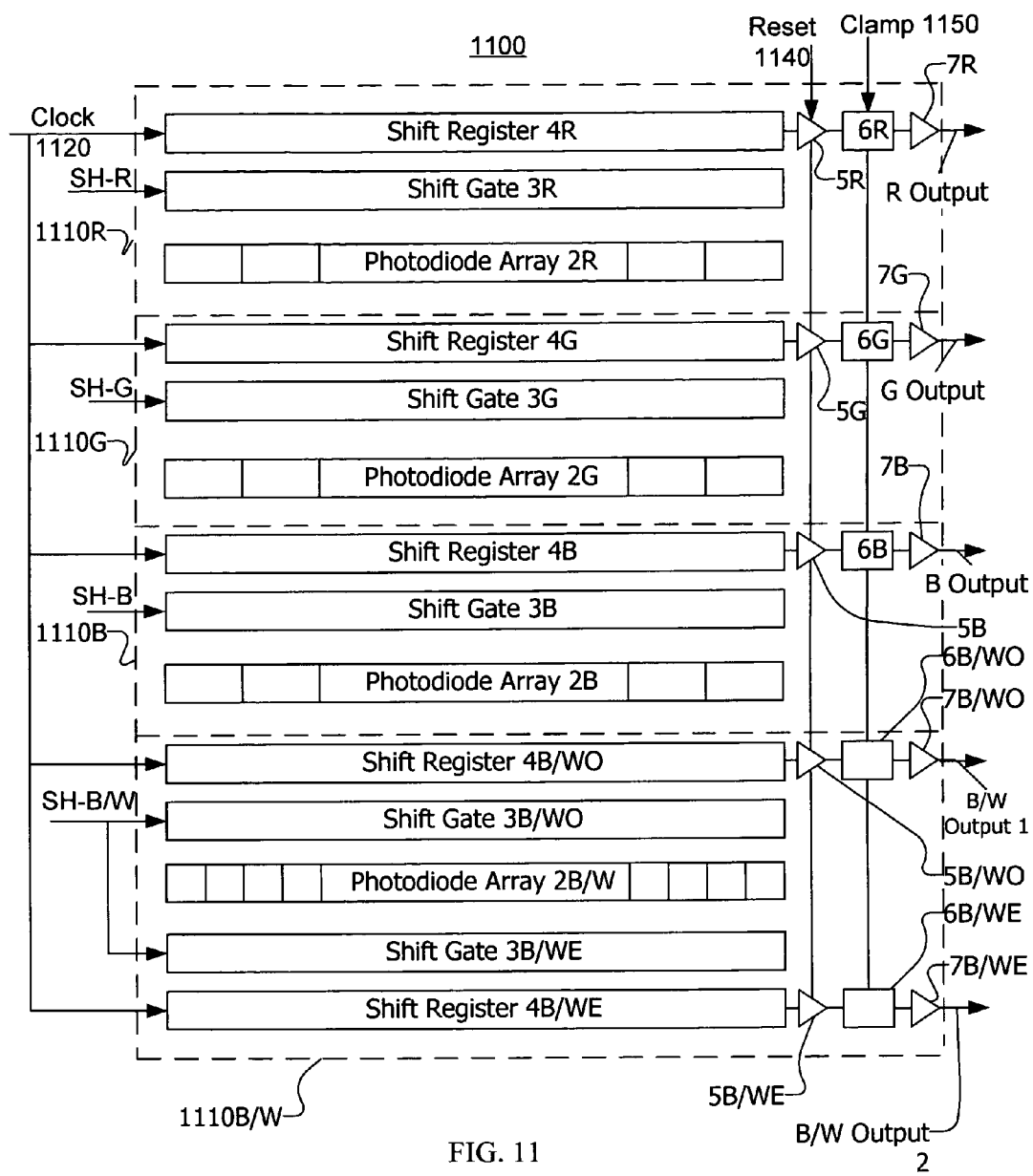
FIG. 11 is a block diagram of an image sensor unit of the second embodiment.

Referring now to FIG. 11, there is shown a block diagram of an image sensor unit 1100 of the second embodiment. The image sensor unit 1100 has the same and corresponding parts as those of the image sensor unit 400 of the first embodiment shown in FIG. 4, so the same and corresponding reference numbers are assigned. The position of the image sensor unit 1100 to the whole image reading apparatus is shown in FIG. 3 in the same way as with the image sensor unit 400 of the first embodiment.

In the second embodiment, the relationship between the light receiving surface of the photodiodes of the color photodiode arrays 2R, 2G, 2B and the light receiving surface of the photodiodes of the monochrome photodiode array 2B/W is different than in the first embodiment.

Figure 12:
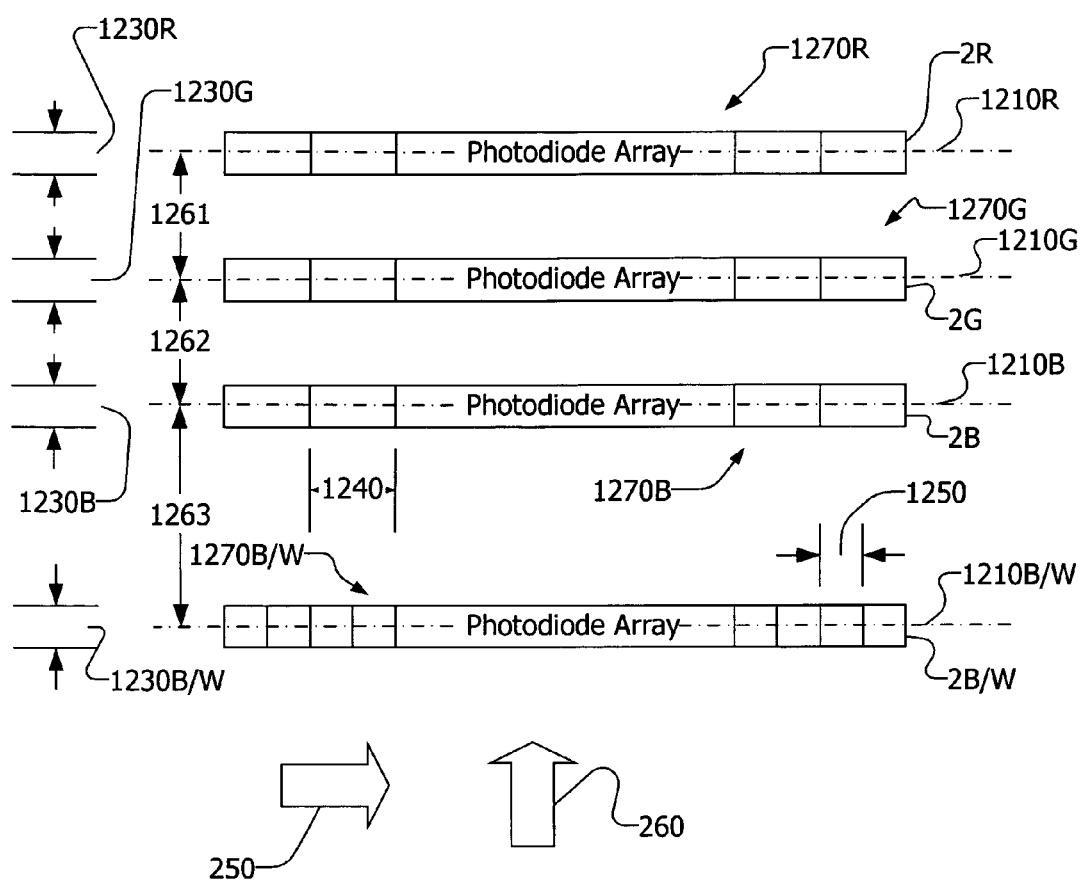
FIG. 12 is an illustration for an arrangement of photodiode arrays of the second embodiment.

Referring now to FIG. 12, there is shown a diagram of the photodiode arrays 2R, 2G, 2B, 2B/W of FIG. 11. As shown in the figures, the photodiode arrays 2R, 2G, 2B, 2B/W include a number of photodiodes 1270R, 1270G, 1270B, 1270B/W. (Although the figures may appear to show the photodiode arrays each having a large central portion, this is intended to represent an undefined number of photodiodes.) The photodiodes 1270R, 1270G, 1270B, 1270B/W have respective light receiving surfaces.

The light receiving surfaces of each respective photodiode 1270R, 1270G, 1270B, 1270B/W have a size and shape. The light receiving surfaces of the color photodiodes 1270R, 1270G, 1270B may have a uniform width 1240. The individual light receiving surfaces of the monochrome photodiodes 1270B/W may have a uniform width 1250. The light receiving surfaces of the color photodiodes 1270R, 1270G, 1270B may have uniform height 1230R, 1230G, 1230B. The individual light receiving surfaces of the monochrome photodiodes 1270B/W may have a uniform height 1230B/W.

Each light receiving surface of the photodiodes 1270R, 1270G, 1270B, 1270B/W defines an area. In the second embodiment, the area of the monochrome photodiodes 1270B/W is ½ of the light receiving area of the color photodiodes 1270R, 1270G, 1270B. The area of the color photodiodes 1270R, 1270G, 1270B may be the same.

The light receiving surfaces of the photodiodes 1270B/W may have the shape of a square. The light receiving surfaces of the photodiodes 1270R, 1270G, 1270B may have the shape of a rectangle. The width 1240 may be twice the width 1250. The height 1230R, 1230G, 1230B may be equal to the height 1230B/W. Therefore, there may be twice as many photodiodes in the monochrome photodiode array 2B/W as in any one of the color photodiode arrays 2R, 2G, 2B.

For each photodiode array 2R, 2G, 2B, 2B/W, there may be defined a respective center line 1210R, 1210G, 1210B, 1210B/W. The photodiode arrays 2R, 2G, 2B, 2B/W may be aligned in the main scanning direction 250, such that the center lines 1210R, 1210G, 1210B, 1210B/W are parallel to the main scanning direction 250.

The photodiode arrays 2R, 2G, 2B, 2B/W may be spaced at respective intervals 1261, 1262, 1263, and disposed in positions relative one another as shown. In the sub-scanning direction 260, the intervals between the center lines 1210R, 1210G, 1210B, 1210B/W may be an integral multiple of the reading pitch.

Figure 13:
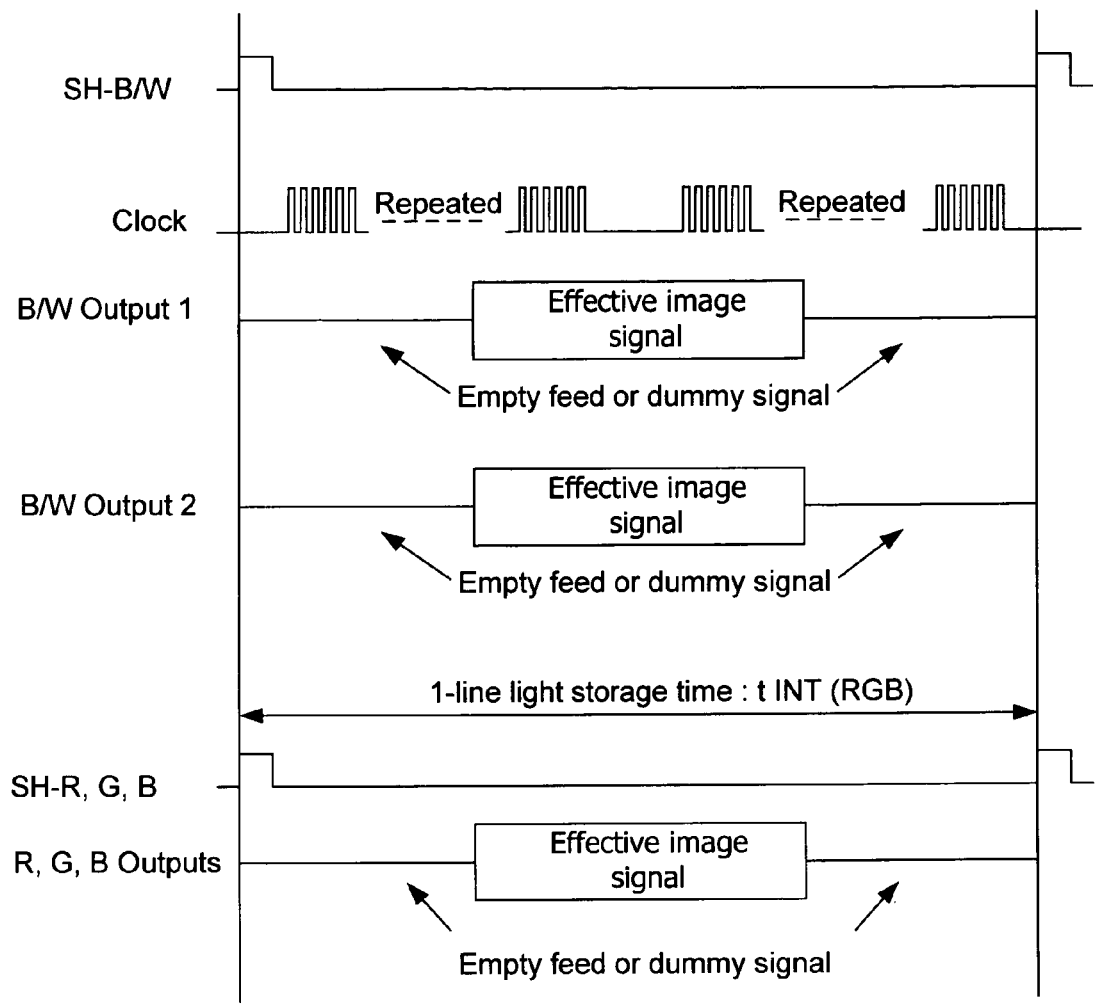
FIG. 13 is a timing chart showing the operation of the image sensor unit of the second embodiment.

Referring now to FIG. 13, there is shown a timing chart showing the operation of the image sensor unit 1100 of the second embodiment. FIG. 13 shows a case that the number of photodiodes (the number of pixels in the main scanning direction) of the monochrome photodiode array 2B/W is 7500.

The timing generation circuit 335 (FIG. 3) gives the shift instruction signals SH-R, SH-G, SH-B, SH-B/W to the image sensor unit 1100. The shift instruction signals SH-R, SH-G, SH-B, SH-B/W may be the same. The timing generation circuit 335 gives a common clock signal 1120 to the shift registers 4R, 4G, 4B, 4B/WO, 4B/WE.

In the second embodiment, the resolution of the monochrome output signals B/W Output 1, B/W Output 2 from the image sensor unit 1100 is twice the resolution of the color output signals (R Output, G Output, B Output).

In the second embodiment, the process of the inter-line correction circuit 330 is slightly different from that of the first embodiment. The processes of the other circuits 315, 320, 325, 335, 340, 350 are almost the same as those of the first embodiment. In the second embodiment, the inter-line correction circuit 330 does not perform an interpolation process of doubling the number of lines (resolution) in the sub-scanning direction 260 for the color output.

Figure 33:
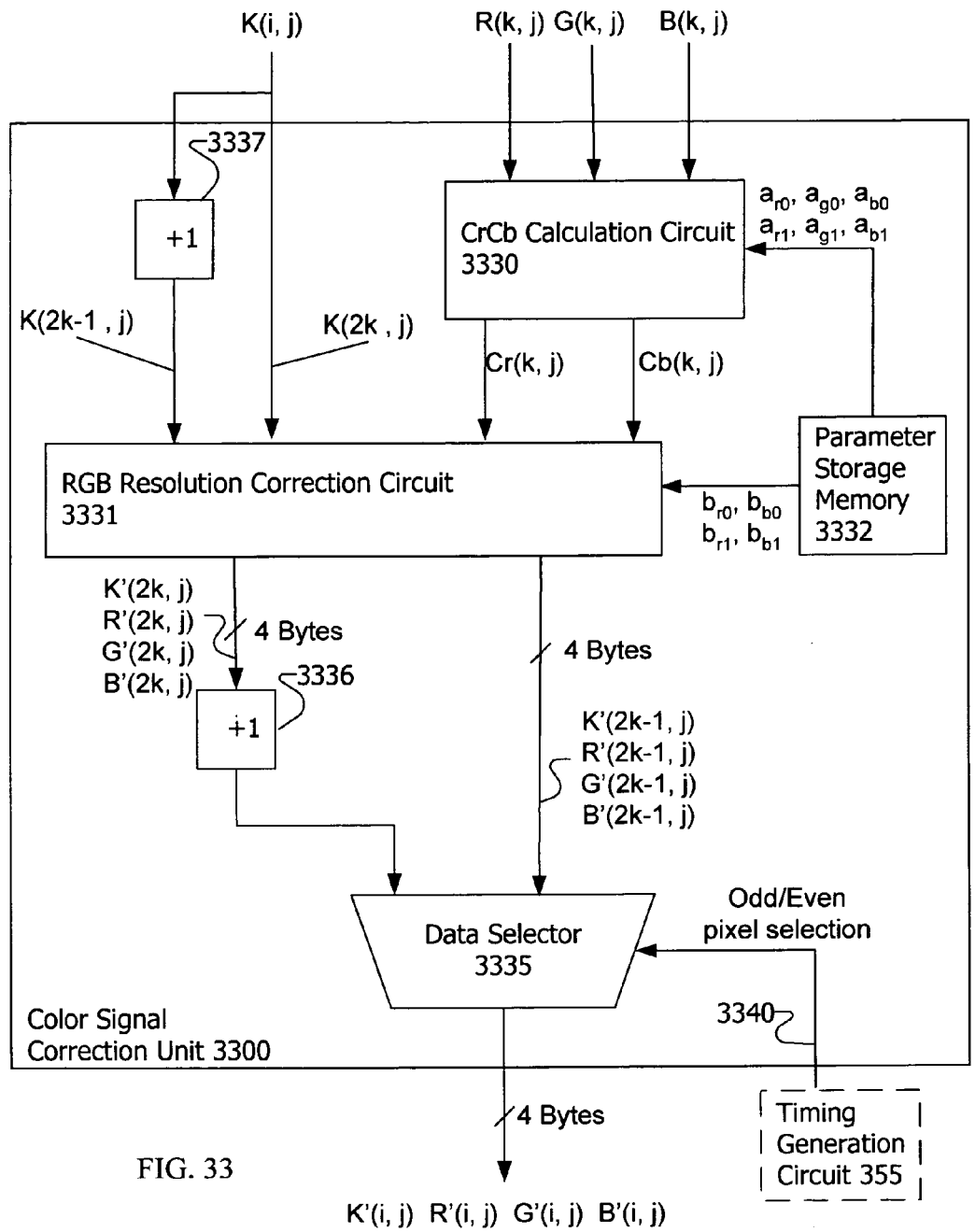
FIG. 33 is a block diagram of a color signal correction unit of the second embodiment.
Figure 34:
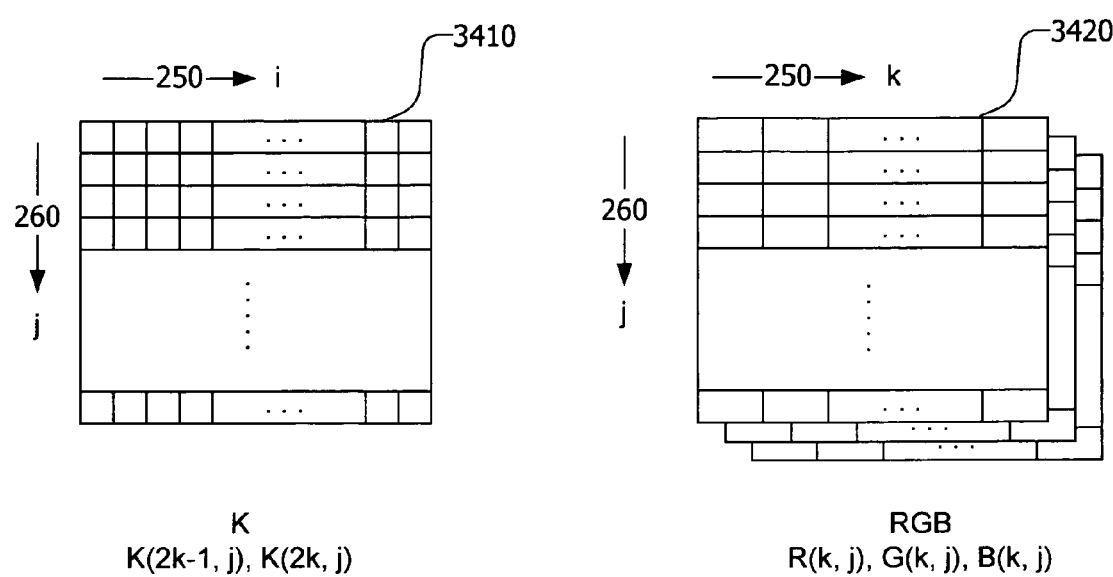
FIG. 34 shows an outline of a color scanning process of the second embodiment.

Referring now to FIG. 33, there is shown a block diagram of a color signal correction unit 3300 of the second embodiment. FIG. 34 is a schematic explanatory diagram of the process of the color signal correction unit 3300. Monochrome signals and color signals represented by the same number of bits are input to the color signal correction unit 3300.

In FIG. 33, the color signal correction unit 3300 has a CrCb calculation circuit 3330, an RGB resolution correction circuit 3331, a parameter storage memory 3332, one-pixel delays 3336, 3337, and a data selector 3335.

The color signal correction unit 3300 receives the monochrome pixel data K(i, j) in the relation shown in parts A and B of FIG. 34 and the color pixel data R(k, j), G(k, j), B(k, j) in parallel.

The CrCb calculation circuit 3330 and the one-pixel delay buffer 3337 perform a YCrCb conversion indicated in Formulas (19) to (22). The CrCb calculation circuit 3330, uses the color pixel data R(k, j), G(k, j), B(k, j) and the parameters $a_{r0}$, $a_{g0}$, $a_{b0}$, $a_{r1}$, $a_{g1}$, and $a_{b1}$ stored in the parameter storage memory 3332.

$$Y(2k-1, j) = K(2k-1, j) \tag{19}$$

$$Y(2k, j) = K(2k, j) \tag{20}$$

$$Cr(k, j) = a_{r0}R(k, j) + a_{g0}G(k, j) + a_{b0}B(k, j) \tag{21}$$

$$Cb(k, j) = a_{r1}R(k, j) + a_{g1}G(k, j) + a_{b1}B(k, j) \tag{22}$$

The RGB resolution correction circuit 3331 executes the RGB reverse conversion meeting Formulas (23) to (28) using the parameters $b_{r0}$, $b_{r1}$, $b_{b0}$, and $b_{b1}$ stored in the parameter storage memory 3332 and obtains three primary colors R', G', B' with the resolution (the number of pixels) in the main scanning direction 250 increased.

$$R'(2k-1,j) = K(2k-1,j) + b_{r0}Cr(k,j) \tag{23}$$

$$G'(2k-1,j) = K(2k-1,j) - b_{r1}Cr(k,j) + b_{b0}Cb(k,j) \tag{24}$$

$$B'(2k-1,j) = K(2k-1,j) + b_{b1}Cb(k,j) \tag{25}$$

$$R'(2k,j) = K(2k,j) + b_{r0}Cr(k,j) \tag{26}$$

$$G'(2k,j) = K(2k,j) - b_{r1}Cr(k,j) + b_{b0}Cb(k,j) \tag{27}$$

$$B'(2k,j) = K(2k,j) + b_{b1}Cb(k,j) \tag{28}$$

The one-pixel delay 3336 may delay the signals K'(2k, j), R'(2k, j), G'(2k, j), B'(2k, j) from the RGB resolution correction circuit 3331 by one pixel period, and then may give the signals to the data selector 3335 as a first selection input. The RGB resolution correction circuit 3331 may give the obtained signals K'(2k−1, j), R'(2k−1, j), G'(2k−1, j), B'(2k−1, j) to the data selector 3335 as a second selection input. FIG. 33 shows a case that even in the color mode, the brightness signal, that is, the monochrome signal K'(i, j) is output from the color signal correction unit 3300.

The data selector 3335, according to a discrimination signal 3340 (indicated as Odd/Even line discrimination signal in FIG. 33) from the timing generation circuit 335, selects and outputs K'(i, j), R'(i, j), G'(i, j), B'(i, j).

By the image sensor unit 1100 of the second embodiment and the image reading apparatus adopting it, almost the same effects as those of the first embodiment can be obtained.

In addition to it, the light receiving surface of each photodiode of the color photodiode arrays are short in the sub-scanning direction 260, so that further miniaturization of the one-dimensional image sensor unit 1100 and a further decrease in cost can be expected. Even in this case, the color resolution in the main scanning direction 250 is improved by the function of the color signal correction unit 335.

(C) THIRD EMBODIMENT

Figure 14:
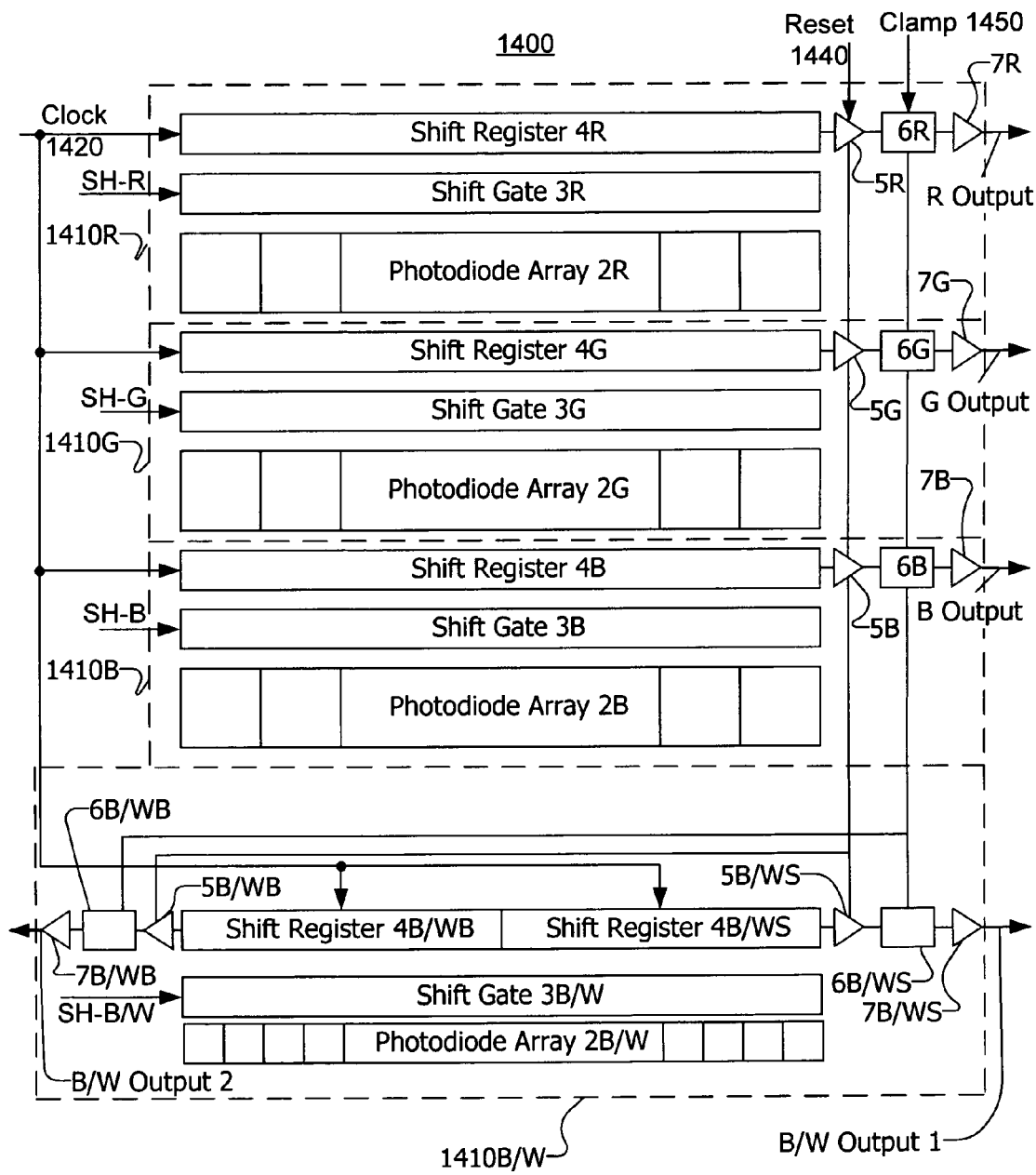
FIG. 14 is a block diagram of the image sensor unit of the third embodiment.

Referring now to FIG. 14, there is shown a block diagram of an image sensor unit 1400 of a third embodiment. In FIG. 14, the same and corresponding numerals are assigned to the same and corresponding parts as those of the image sensor unit 400 of the first embodiment.

The position of the image sensor unit 1400 to the whole image reading apparatus is the position shown in FIG. 3 in the same way as with the image sensor unit 400 of the first embodiment.

In the image sensor unit 1400, the relationship between the light receiving surface of each photodiode of the photodiode arrays 2R, 2G, 2B for the three primary colors R, G, B and the light receiving surface of each photodiode of the monochrome photodiode array 2B/W may be the same as that of the first embodiment.

The difference of the image sensor unit 1400 from that of the first embodiment is a constitution for outputting the stored charge of the monochrome photodiode array 2B/W. In particular, instead of the monochrome shift registers 4B/WO, 4B/WE of the first embodiment, the third embodiment has shift registers 4B/WS and 4B/WB. The shift register 4B/WS receives and stores the charges of the photodiodes in the low arrangement order of the photodiode array 2B/W. The shift register 4B/WB receives and stores the charges of the photodiodes in the high arrangement order of the photodiode array 2B/W. Instead of having two shift gates as in the first embodiment, a single shift gate 3B/W transfers and controls the stored charge of the photodiode array 2B/W to the shift registers 4B/WS and 4B/WB.

The third embodiment handles the signals from the shift registers 4B/WS and 4B/WB similarly to the first embodiment. Thus, there are also reset gates 5B/WS, 5B/WB, clamp circuits 6B/WS, 6B/WB and amplifiers 7B/WS, 7B/WB.

In the third embodiment, the processing system for reading image signals after the analog processing unit 315 is almost the same as that of the first embodiment.

Figure 15:
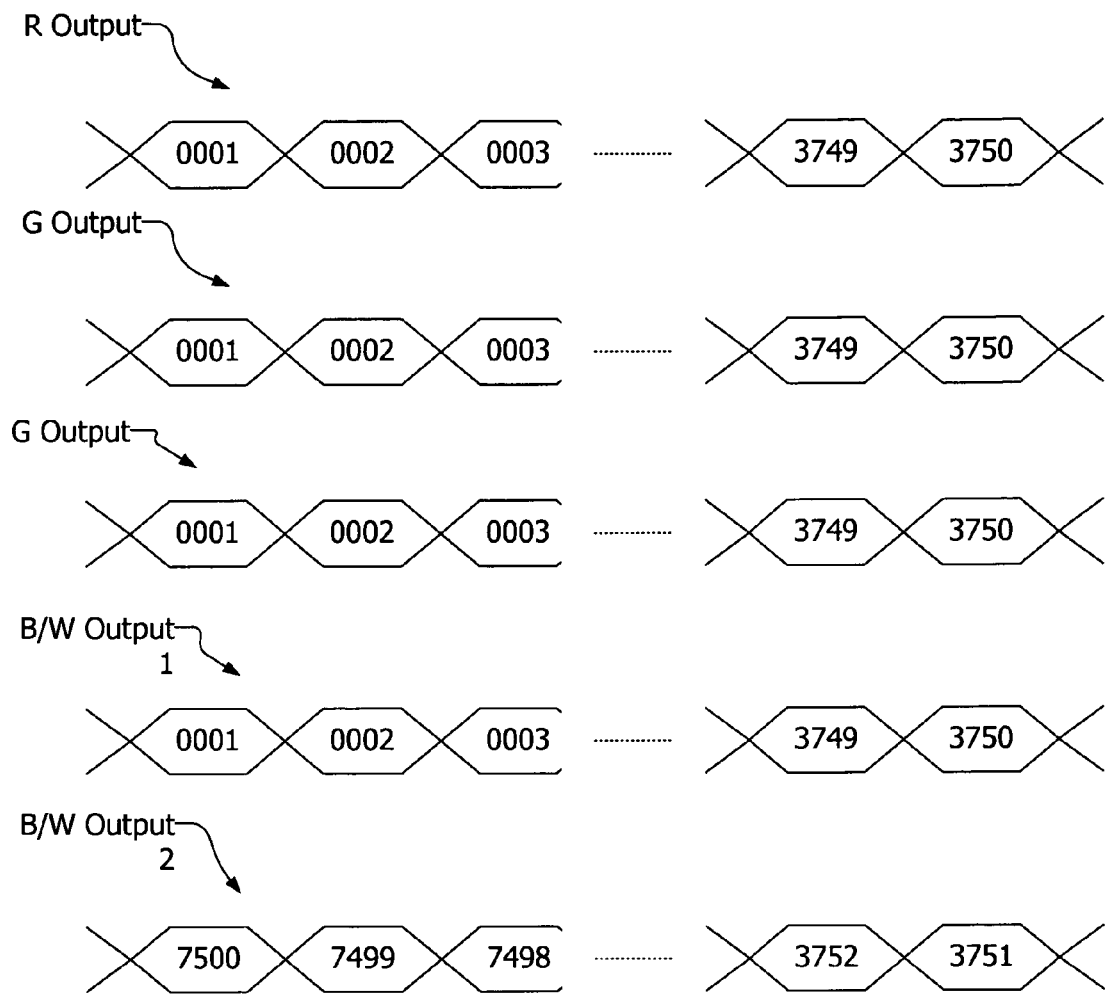
FIG. 15 is a timing chart showing the outline of output from the image sensor unit of the third embodiment.

The monochrome outputs B/W Output 1, B/W Output 2 from the image sensor unit 1400 may be in the ascending order and descending order as shown in FIG. 15. If so, then the process of unifying the monochrome signals of the two channels to a monochrome signal of one channel is somewhat different from that of the first embodiment.

By the image sensor unit 1400 and the image reading apparatus adopting it, almost the same effects as those of the first embodiment can be obtained. In addition to it, the two shift registers 4B/WS and 4B/WB and the shift gate 3B/W may be arranged only in the up-down direction of the photodiode array 2B/W, so that further miniaturization of the image sensor unit 1400 and a further decrease in cost can be expected.

(D) FOURTH EMBODIMENT

Figure 16:
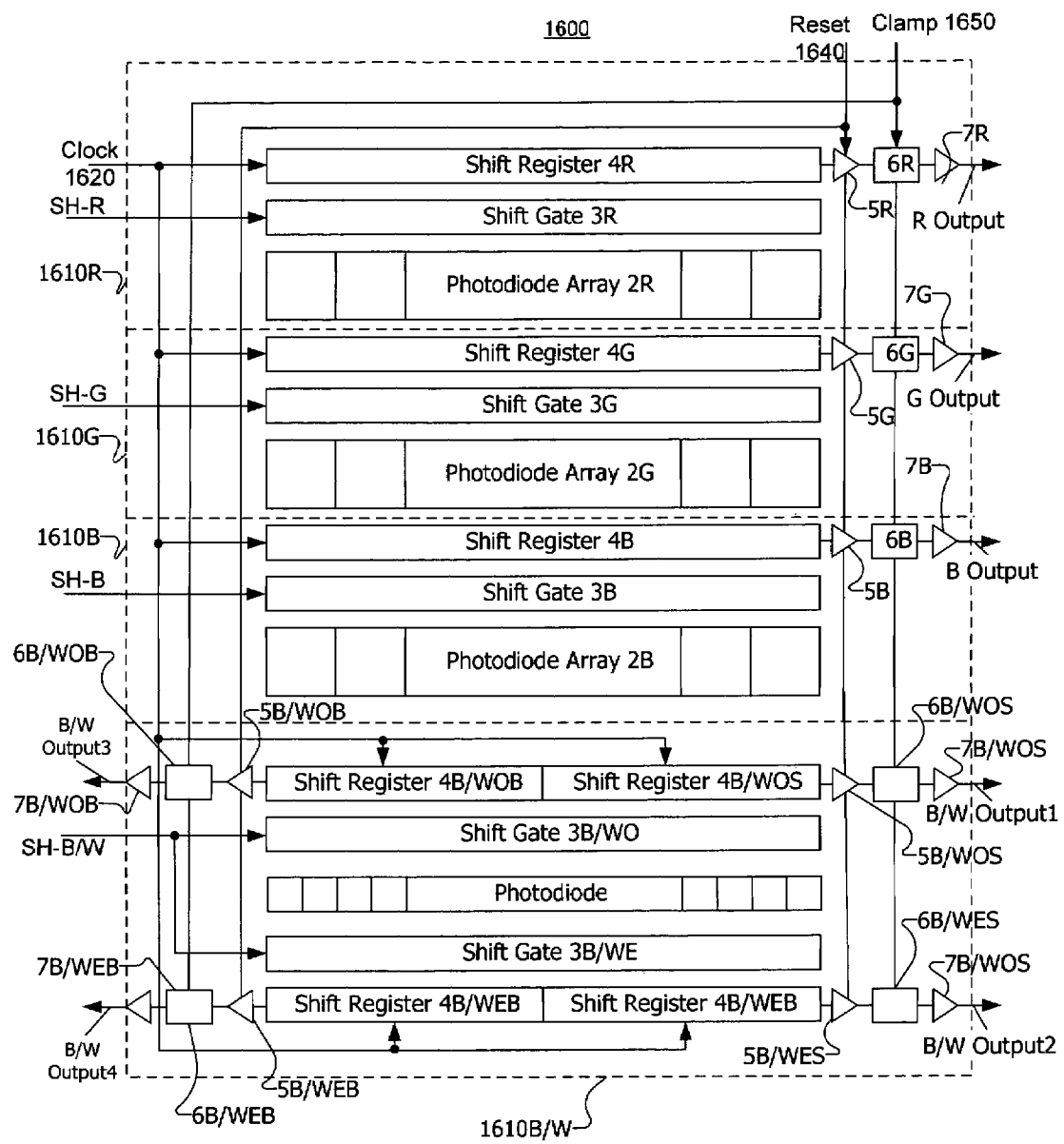
FIG. 16 is a block diagram of the image sensor unit of the fourth embodiment.

Referring now to FIG. 16, there is shown a block diagram of an image sensor unit 1600 of a third embodiment. In FIG. 16, the same and corresponding numerals are assigned to the same and corresponding parts as those of the image sensor unit 400 of the first embodiment.

In the image sensor unit 1600, the relationship between the light receiving surface of each photodiode of the color photodiode arrays 2R, 2G, 2B and the light receiving surface of each photodiode of the monochrome photodiode array 2B/W may be the same as that of the first embodiment.

In the first embodiment, the image sensor unit 400 has two shift registers 4B/WO, 4B/WE for the monochrome photodiode array 2B/W. In contrast, the fourth embodiment has four monochrome shift registers 4B/WOB, 4B/WOS, 4B/WEB, 4B/WES. The shift register 4B/WOS stores charges of the low-order odd numbered photodiodes. The shift register 4B/WOB stores charges of the high-order odd numbered photodiodes. The shift register 4B/WES stores charges of the low-order even numbered photodiodes. The shift register 4B/WEB stores charges of the high-order even numbered photodiodes.

Further, in correspondence with installation of the four shift registers 4B/WOS, 4B/WOB, 4B/WES, 4B/WEB, four reset gates 5B/WOS, 5B/WOB, 5B/WES, 5B/WEB, four clamp circuits 6B/WOS, 6B/WOB, 6B/WES, 6B/WEB, and four amplifiers 7B/WOS, 7B/WOB, 7B/WES, 7B/WEB are included.

The fourth embodiment processes the image signals after the analog processing unit 315 almost the same as that in the first embodiment. However, to accommodate the four channels of monochrome output B/W Output 1, B/W Output 2, B/W Output 3, B/W Output 4, the analog processing unit 315 and the A-D conversion circuit 320 have a 4-channel processing system for monochrome signals.

Figure 17:
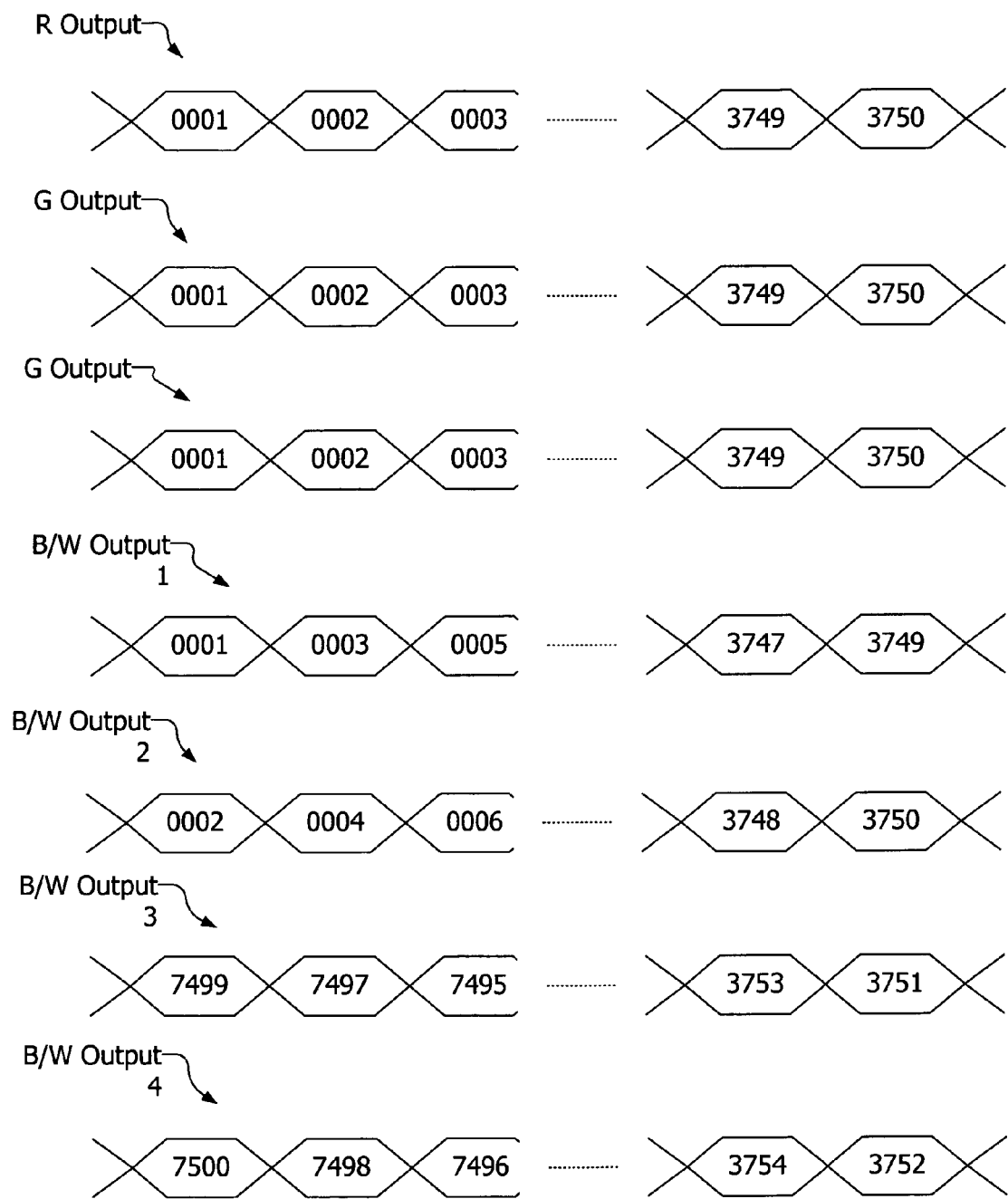
FIG. 17 is a timing chart showing the outline of output from the image sensor unit of the fourth embodiment.

The monochrome output B/W Output 1, B/W Output 2, B/W Output 3, B/W Output 4 may be in ascending order and descending order as shown in FIG. 17. If so, then the A-D conversion circuit 320 may unify the converted four-channel monochrome signals to a 1-channel monochrome signal in consideration of the arrangement order.

By the image sensor unit 1600 and the image reading apparatus adopting it, almost the same effects as those of the first embodiment can be obtained. In addition, reading from the image sensor unit 1600 is executed by a plurality of channels for the monochrome photodiode arrays, so that speeding up of the reading speed can be expected.

(E) FIFTH EMBODIMENT

Figure 18:
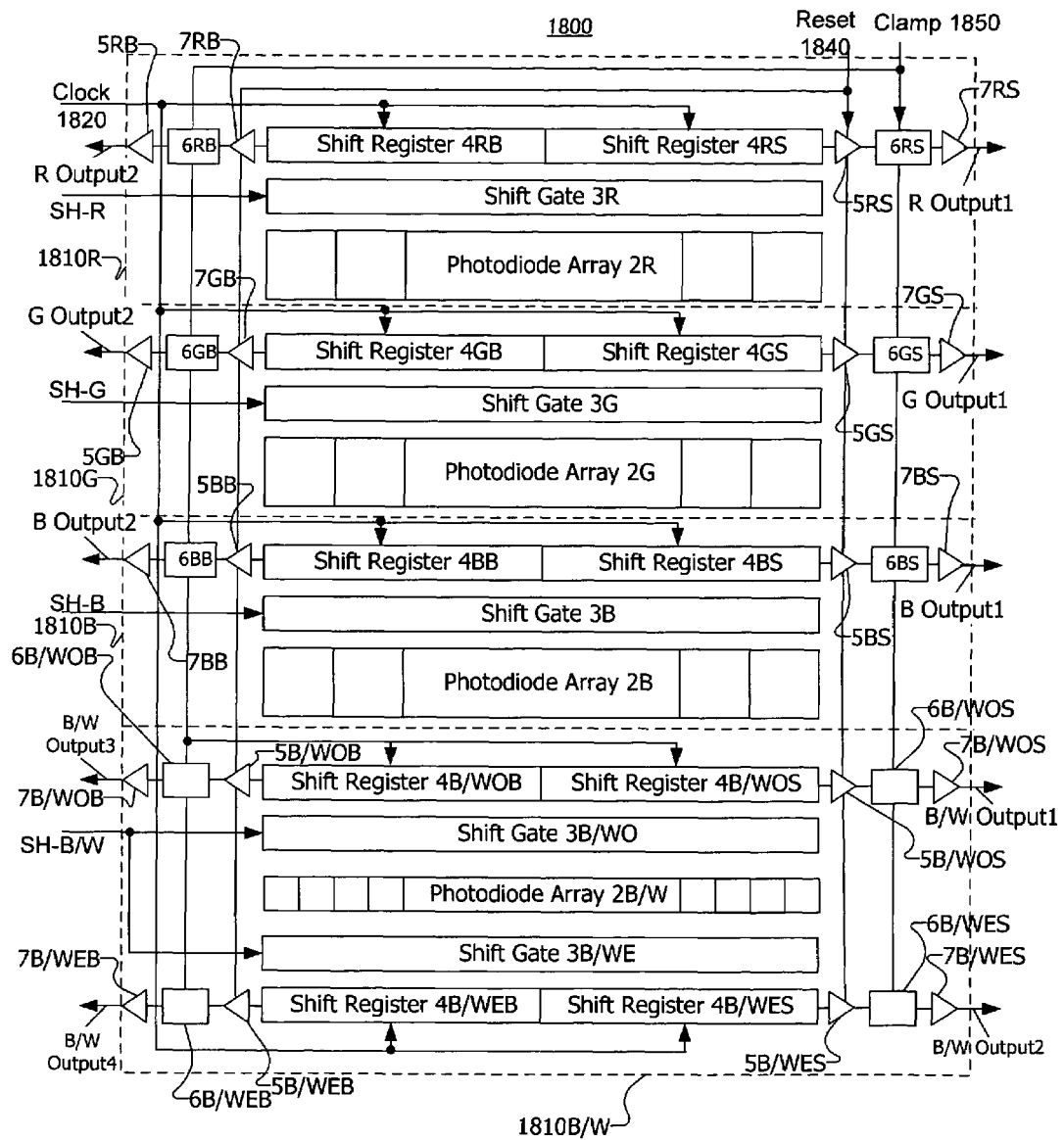
FIG. 18 is a block diagram of the image sensor unit of the fifth embodiment.

Referring now to FIG. 18, there is shown a block diagram of an image sensor unit 1800 of a fifth embodiment. In FIG. 18, the same and corresponding numerals are assigned to the same and corresponding parts as those of the image sensor units 400, 1600 of the first and fourth embodiments.

In the image sensor unit 1800, the relationship between the light receiving surface of each photodiode of the color photodiode arrays 2R, 2G, 2B and the light receiving surface of each photodiode of the monochrome photodiode array 2B/W is the same as that of the first embodiment. In the same way as with the fourth embodiment, there is a four-channel constitution for outputting the stored charge of the monochrome photodiode array 2B/W. However, the color photodiode arrays 2R, 2G, 2B each have a two-channel output. The two output channels from each photodiode array 2R, 2G, 2B come from respective low-order and high-order numbered photodiodes.

shift registers 4RS, 4GS, 4BS store charges of the low-order photodiodes. shift registers 4RB, 4GB, 4BB store charges of the high-order photodiodes. The shift gates 3R, 3G, 3B operate common to the two channels.

In correspondence with the shift registers 4RS, 4GS, 4BS, 4RB, 4GB, 4BB there are reset gates 5RS, 5GS, 5BS, 5RB, 5GB, 5BB, clamp circuits 6RS, 6GS, 6BS, 6RB, 6GB, 6BB, and amplifiers 7RS, 7GS, 7BS, 7RB, 7GB, and 7BB.

The processing for image signals after the analog processing unit 315 is almost the same as that of the first embodiment.

Figure 19:
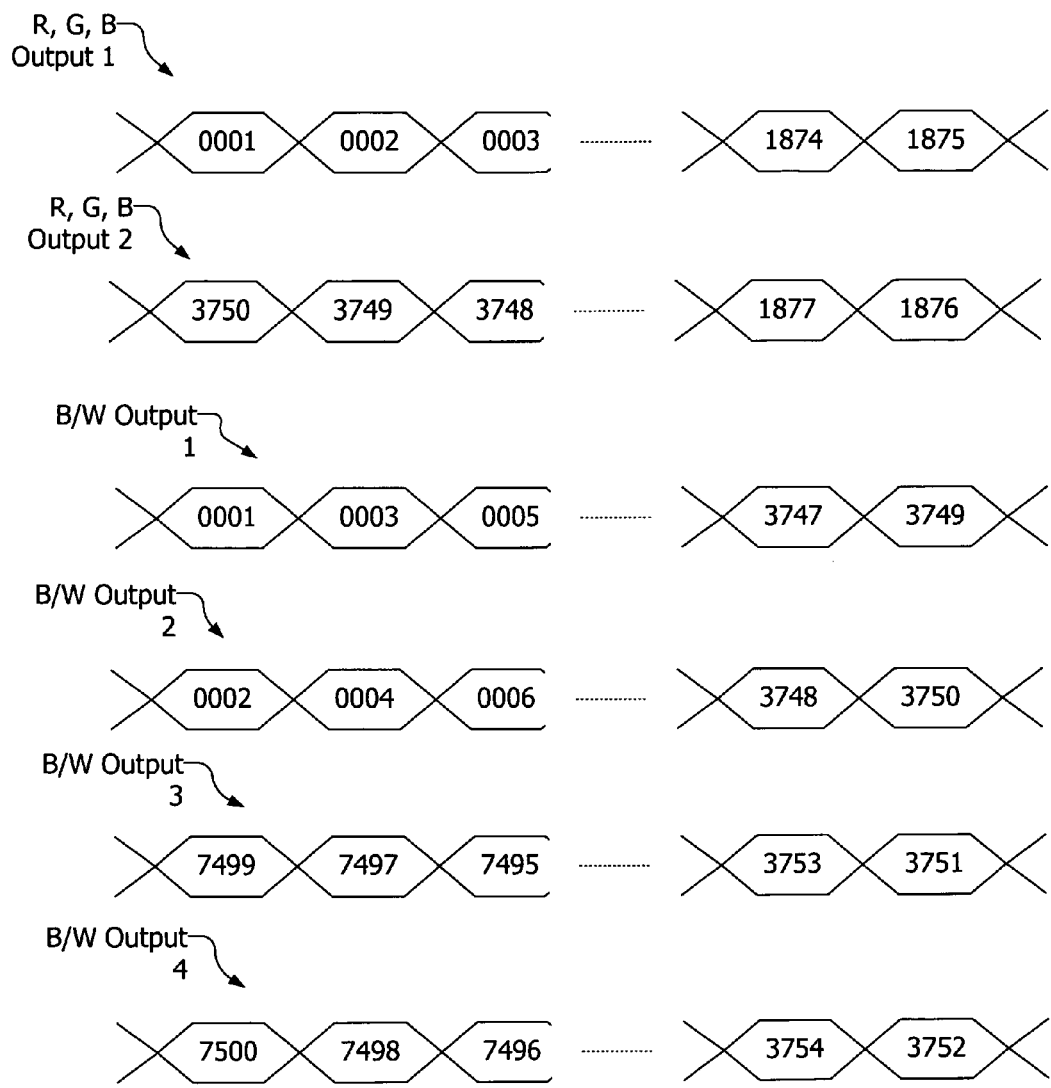
FIG. 19 is a timing chart showing the outline of output from the image sensor unit of the fifth embodiment.

In the fifth embodiment, the analog processing unit 315 and the A-D conversion circuit 320 have two-channel processing system for the color signals and four-channel processing system for the monochrome signals. The output signals from the image sensor unit 1800 may be as shown in FIG. 19. The A-D conversion circuit 320 may unify the converted two-channel color signals to one-channel color signals. The A-D conversion circuit 320 may unify the converted four-channel monochrome signals to one-channel monochrome signal.

By the image sensor unit 1800 and the image reading apparatus adopting it, almost the same effects as those of the first embodiment can be obtained. In addition, reading from the image sensor unit 1800 is executed by a plurality of channels for the respective photodiode arrays, so that speeding up of the reading speed can be expected.

(F) SIXTH EMBODIMENT

Figure 20:
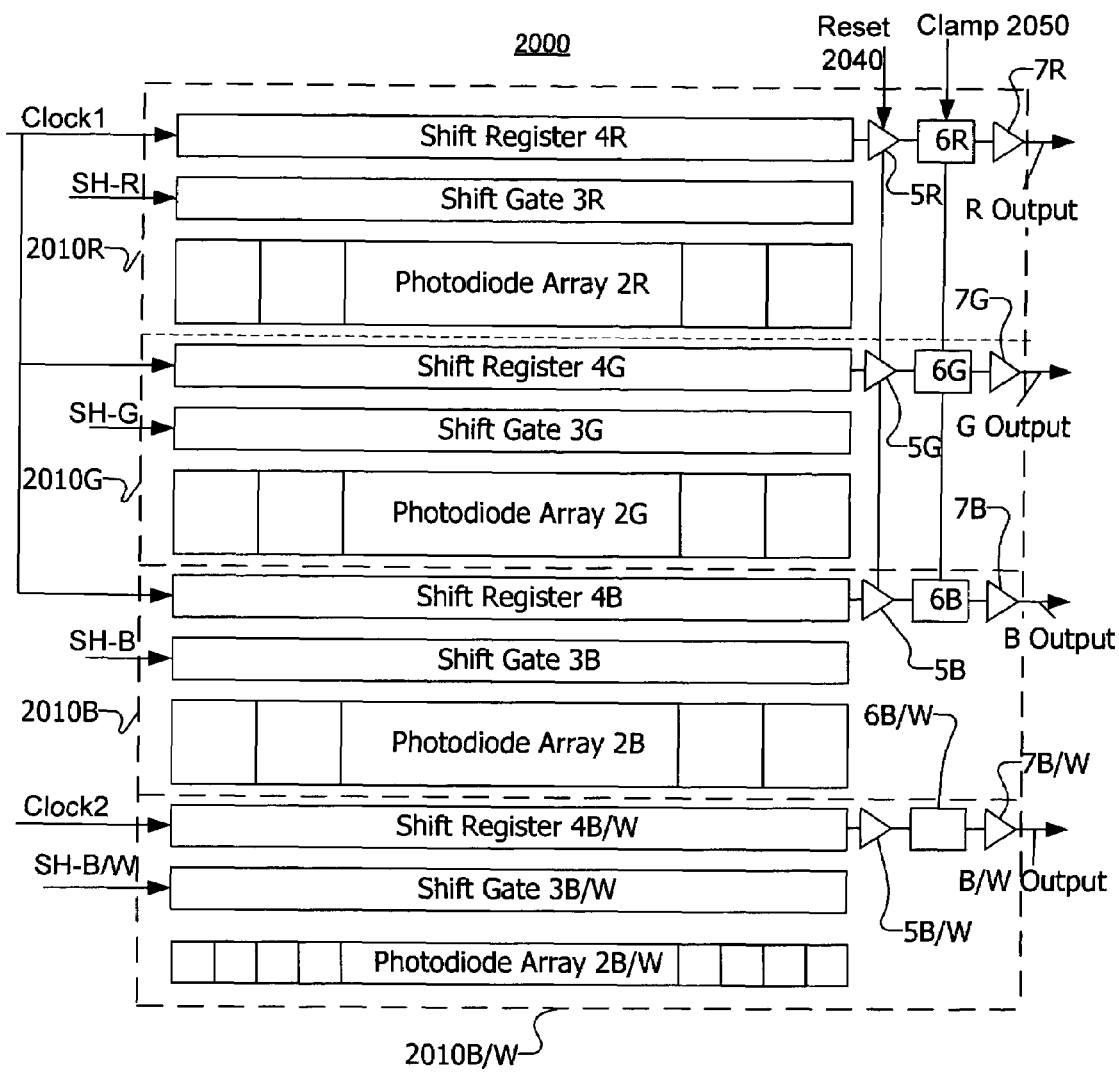
FIG. 20 is a block diagram of the image sensor unit of the sixth embodiment.

Referring now to FIG. 20, there is shown a block diagram of an image sensor unit 2000 of a sixth embodiment. In FIG. 20, the same and corresponding numerals are assigned to the same and corresponding parts as those of the image sensor units 400 of the first embodiment.

The position of the one-dimensional image sensor unit 2000 to the whole image reading apparatus is the position shown in FIG. 3 in the same way as with the image sensor unit 400 of the first embodiment.

In the image sensor unit 2000, the relationship between the light receiving surface of each photodiode of the color photodiode arrays 2R, 2G, 2B and the light receiving surface of each photodiode of the monochrome photodiode array 2B/W is the same as that of the first embodiment. However, in the image sensor unit 2000, the color constitution and monochrome constitution are formed on the same chip independently of each other.

The color constitution may be the same as that of the first embodiment, so that the explanation therefore will be omitted.

The monochrome constitution is different from that of the first embodiment. Namely, the shift gate 3B/W, shift register 4B/W, reset gate 5B/W, clamp circuit 6B/W, and amplifier 7B/W have a one-channel constitution.

Further, a clock signal (Clock 1) to the monochrome shift register 4B/W and a clock signal (Clock 2) to the shift registers 4R, 4G, 4B for the three primary colors R, G, and B can be optionally given independently of the outside (e.g., the timing generation circuit 355) of the image sensor unit 2000.

Further, the monochrome output is of a one-channel constitution, so that the monochrome processing system of the analog processing unit 315 and the A-D conversion circuit 320 may be of a one-channel constitution and the A-D conversion circuit 320 does not need to perform a process of unifying a plurality of monochrome channels.

In the image sensor unit 2000, the color constitution and monochrome constitution are formed independently of each other, so that an image reading apparatus incorporating them can be designed optionally. For example, a constitution of processing only signals of the three primary colors R, G, B from the image sensor unit 2000 in the color mode and processing only a monochrome signal from the image sensor unit 2000 in the monochrome mode may be used. In this case, the color signal correction unit 335 may be omitted.

Figure 21:
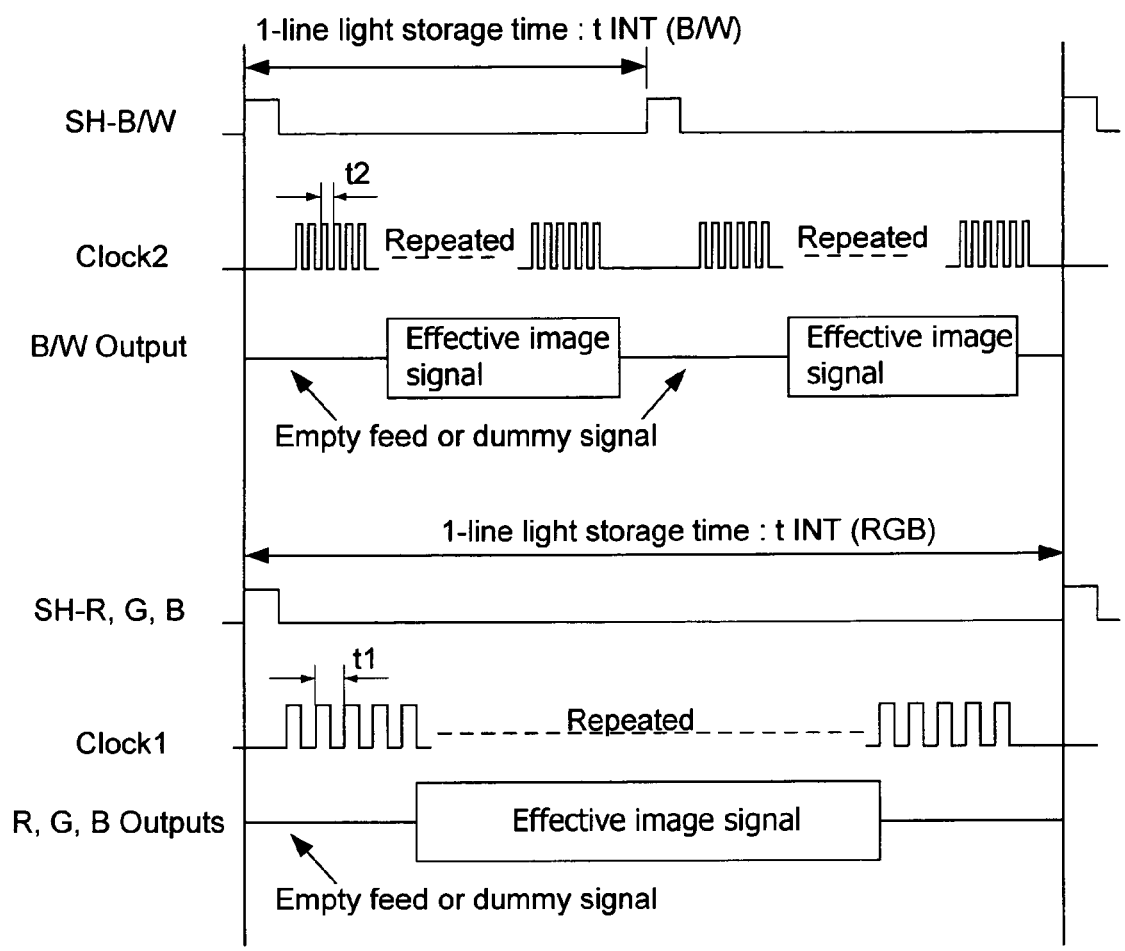
FIG. 21 is a timing chart showing the operation of the image sensor unit of the sixth embodiment.

Further, for example, as shown in FIG. 21, in the color mode, a constitution of reducing the reading speed of signals of the three primary colors R, G, B in the main scanning direction to ½ of the reading speed of a monochrome signal in the main scanning direction may be used. In this case, depending on the selected clock cycle, the processing system after the shading correction unit 325 may be structured exactly in the same way as with the first embodiment.

Furthermore, for example, even in the color mode having a function for improving the resolution of color signals using information of monochrome signals, a double reading method for firstly reading only monochrome signals and then reading color signals (three-primary color signals) may be adopted.

In the image sensor unit 2000, the color constitution and monochrome constitution are formed independently of each other, so that the degree of designing freedom of an image reading apparatus can be increased. Depending on the design contents, the same effects as those of the first embodiment can be produced.

(G) SEVENTH EMBODIMENT

Figure 22:
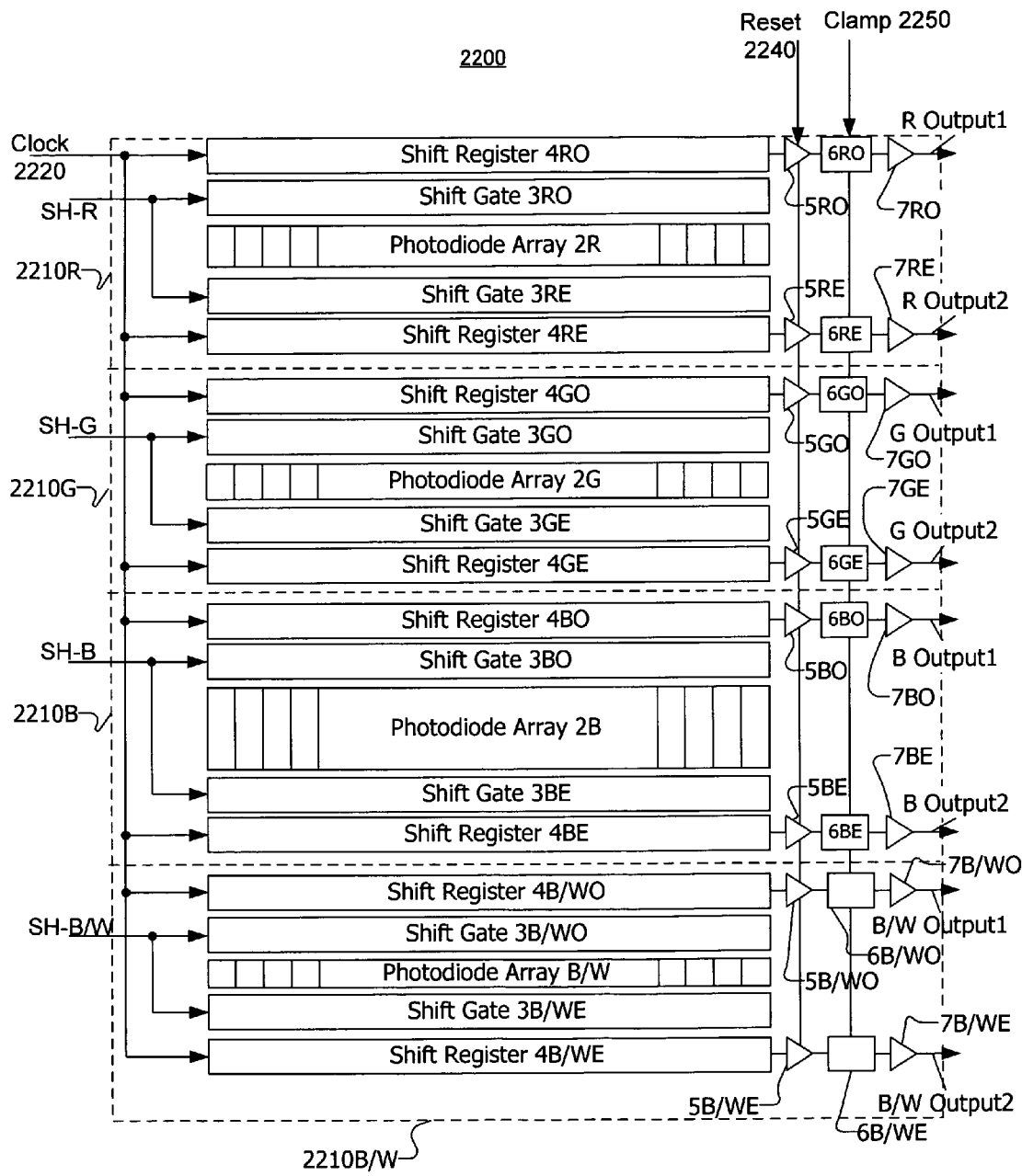
FIG. 22 is a block diagram of the image sensor unit of the seventh embodiment.

FIG. 22 is a block diagram showing the constitution of an image sensor unit 2200 of a seventh embodiment and to the same and corresponding parts as those shown in FIG. 4 relating to the first embodiment, the same and corresponding numerals are assigned. The position of the image sensor unit 2200 to the whole image reading apparatus is the position shown in FIG. 3 in the same way as with the image sensor unit 400 of the first embodiment.

In the image sensor unit 2200, the color photodiode arrays 2R, 2G, 2B and the monochrome photodiode array 2B/W may have the same number of photodiodes (the same number of pixels). However, two outputs R Output 1, R Output 2, G Output 1, G Output 2, B Output 1, B Output 2 from each color photodiode array may be obtained. Thus, for each color signal, shift gates 3RO, 3GO, 3BO, 3RE, 3GE, 3BE, shift registers 4RO, 4GO, 4BO, 4RE, 4GE, 4BE, rest gates 5RO, 5GO, 5BO, 5RE, 5GE, 5BE, clamp circuits 6RO, 6GO, 6BO, 6RE, 6GE, 6BE, and amplifiers 7RO, 7GO, 7BO, 7RE, 7GE, 7BE are provided. The two-channel constitution for the photodiodes of odd numbers and even numbers may be adopted for the four photodiode arrays 2R, 2G, 2B, 2B/W.

Figure 23:
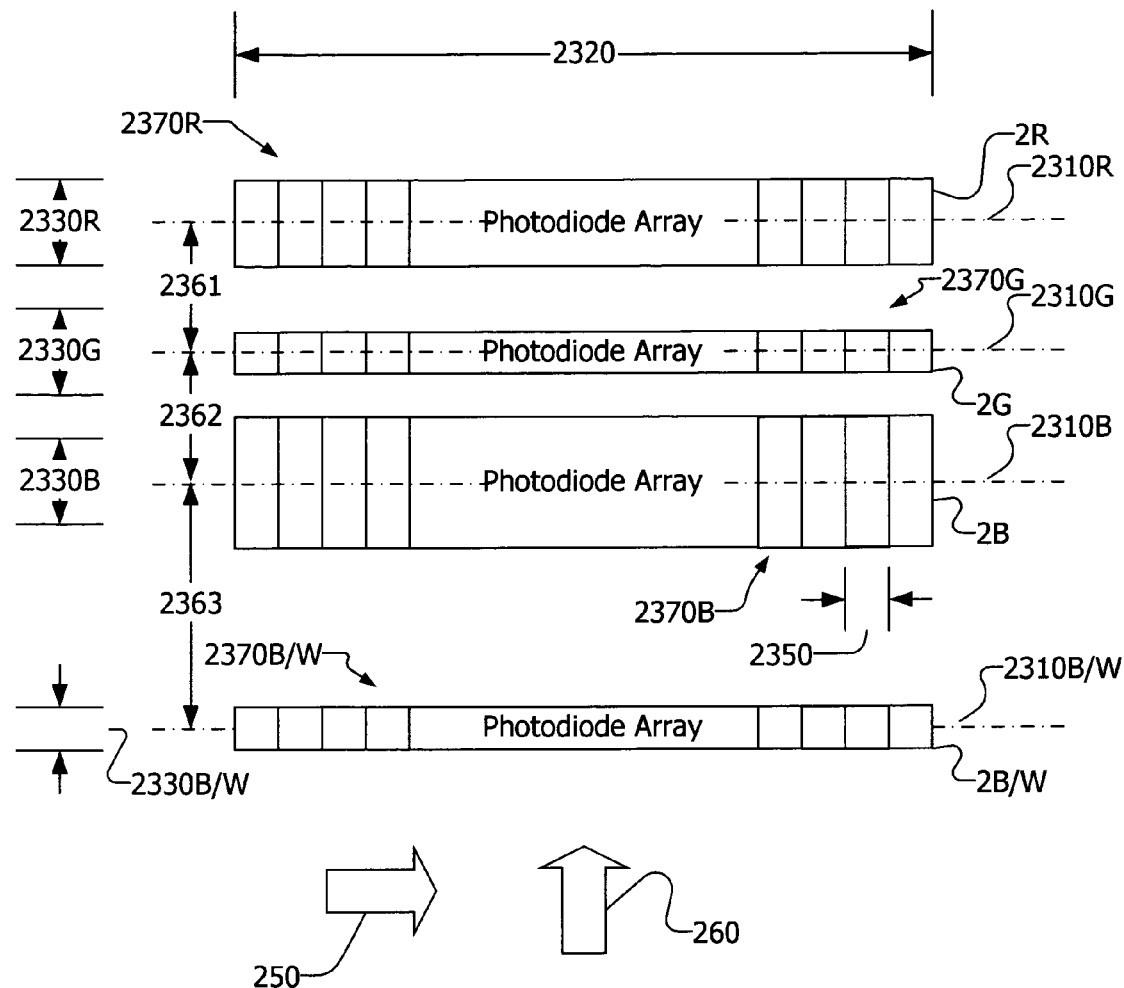
FIG. 23 is an illustration for an arrangement of photodiode arrays of the seventh embodiment.

Referring now to FIG. 23, there is shown a diagram of the photodiode arrays 2R, 2G, 2B, 2B/W. The photodiode arrays 2R, 2G, 2B, 2B/W may have respective widths 2330R, 2330G, 2330B, 2330B/W. For each photodiode array 2R, 2G, 2B, 2B/W, there maybe defined a respective center line 2310R, 2310G, 2310B, 2310B/W. The photodiode arrays 2R, 2G, 2B, 2B/W may be aligned in the main scanning direction 250, such that the center lines 2310R, 2310G, 2310B, 2310B/W are parallel to the main scanning direction 250.

The photodiode arrays 2R, 2G, 2B, 2B/W may be spaced at respective intervals 2361, 2362, 2363, and disposed in positions relative one another as shown. In the sub-scanning direction 260, the intervals between the center lines 2310R, 2310G, 2310B, 2310B/W may be an integral multiple of the reading pitch.

The photodiodes 2370R, 2370G, 2370B, 2370B/W have respective light receiving surfaces. The light receiving surfaces of the photodiodes 2370R, 2370G, 2370B, 2370B/W may have a uniform width 2350.

On the other hand, the light receiving surfaces of the photodiodes 2370R, 2370G, 2370B, 2370B/W may have different heights 2330R, 2330G, 2330B, 2330B/W. The height 2330R, 2330G, 2330B, 2330B/W may be set according to the sensitivity of the light receiving surface (light receiving part) of each photodiode. The sensitivity of the light receiving surface of each photodiode may be affected by many factors, including the transmission characteristic of a color filter (not shown in the drawing).

If the monochrome photodiode array 2B/W has no color filter, its sensitivity will generally be highest. Thus the height 2330B/W may be shortest. The height 2330R, 2330G, 2330B may be shortest in the order of green (G), red (R), and blue (B) which is the descending order of sensitivity (an example).

Figure 24:
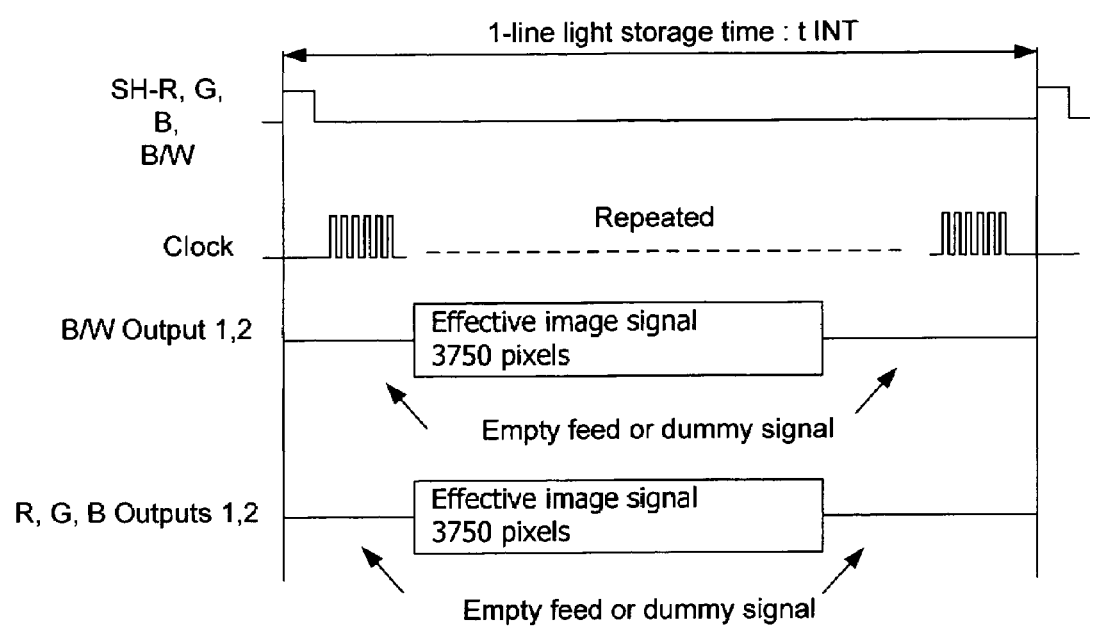
FIG. 24 is a timing chart showing the operation of the image sensor unit of the seventh embodiment.

FIG. 24 is a timing chart showing the operation of the image sensor unit 2200. Further, the drawing shows a case that the number of pixels in the main scanning direction is 7500.

The gate control signals SH-R, SH-G, SH-B for the three primary colors R, G, and B which are given to the one-dimensional image sensor unit 2200 from the timing generation circuit 335 (FIG. 3) and the monochrome gate control signal SH-B/W are the same. As shown in FIG. 22, the clock signal for the shift registers 4RO, 4GO, 4BO, 4RE, 4GE, 4BE is common.

Therefore, in the color and monochrome modes, at the same timing, two-channel signals are output in parallel (B/W Output 1, B/W Output 2, R Output 1, R Output 2, G Output 1, G Output 2, B Output 1, B Output 2).

Figure 25:
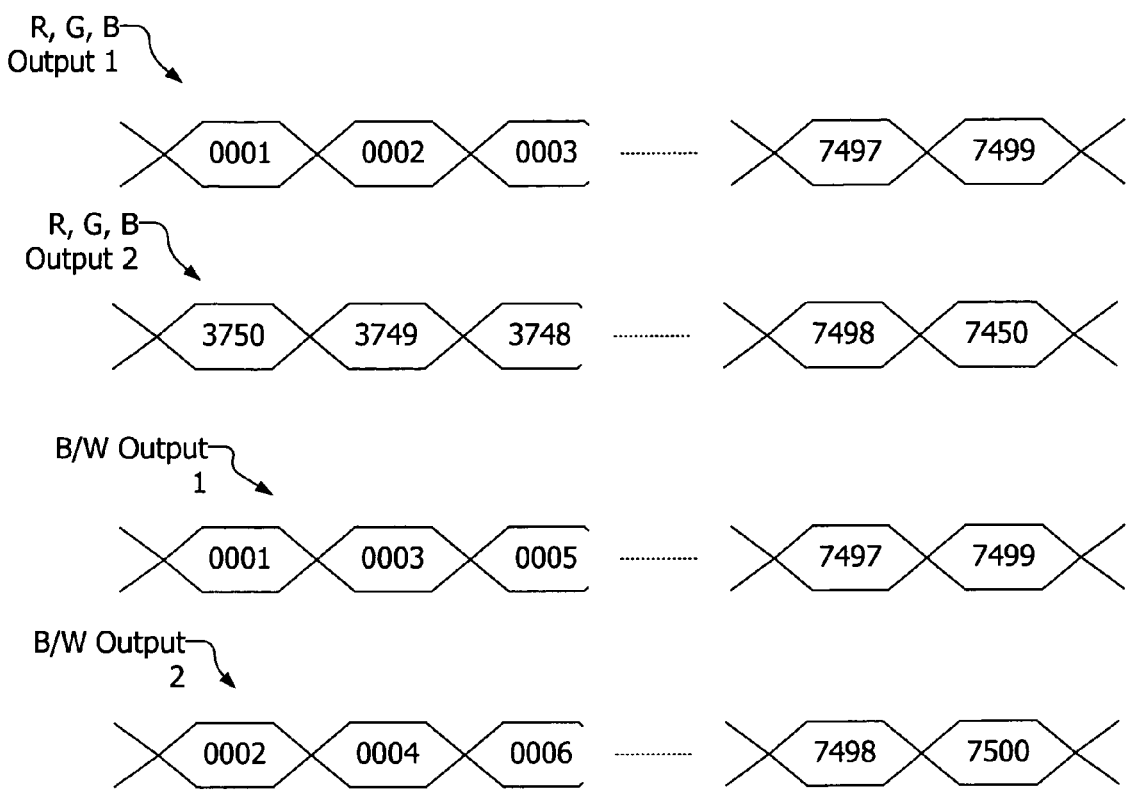
FIG. 25 is a timing chart showing the outline of output from the image sensor unit of the seventh embodiment.

The operation of the processing system for a reading image signal after the analog processing unit 315 is almost the same for the seventh embodiment as in the first embodiment. The analog processing unit 315 and the A-D conversion circuit 320 respectively have a two-channel processing system for the color signals and the A-D conversion circuit 320 unifies the converted two-channel color signals to a one-channel color signal in consideration of the arrangement order shown in FIG. 25. The processes of the analog processing unit 315 and the A-D conversion circuit 320 for a monochrome signal are the same as those of the first embodiment.

The inter-line correction circuit 330, in consideration of differences in position between the color photodiode arrays 2R, 2G, 2B and the monochrome photodiode array 2B/W in the sub-scanning direction 260, may convert and output an output signal from the shading correction unit 325 to a signal when the color lines and monochrome line coincide with each other in the sub-scanning direction 260. However, the number of lines of color output in the sub-scanning direction 260 from the image sensor unit 2200 coincides with that of monochrome output. Thus, unlike the first embodiment, the inter-line correction circuit 330 does not perform an interpolation process of doubling the number of lines (resolution) in the sub-scanning direction 260 for the color output.

In the seventh embodiment, at the stage of output from the inter-line correction circuit 330 (more retroactively, at the stage of output from the image sensor unit 2200), the numbers of color pixels and monochrome pixels in the main scanning direction and sub-scanning direction are equal to each other, so that the color signal correction unit 335 may be omitted.

Further, when the dynamic level (gradation) of the stored charge of each color photodiode is considerably lower than the dynamic level (gradation) of the stored charge of each monochrome photodiode, even if the light receiving area of each photodiode is changed by the light receiving component, the number of bits of a digital signal from the A-D conversion circuit 320 may be made different between the color photodiodes and the monochrome photodiodes. For example, the A-D conversion circuit 320 may convert color signals to four-bit digital signals and monochrome signals to eight-bit digital signals.

Figure 26:
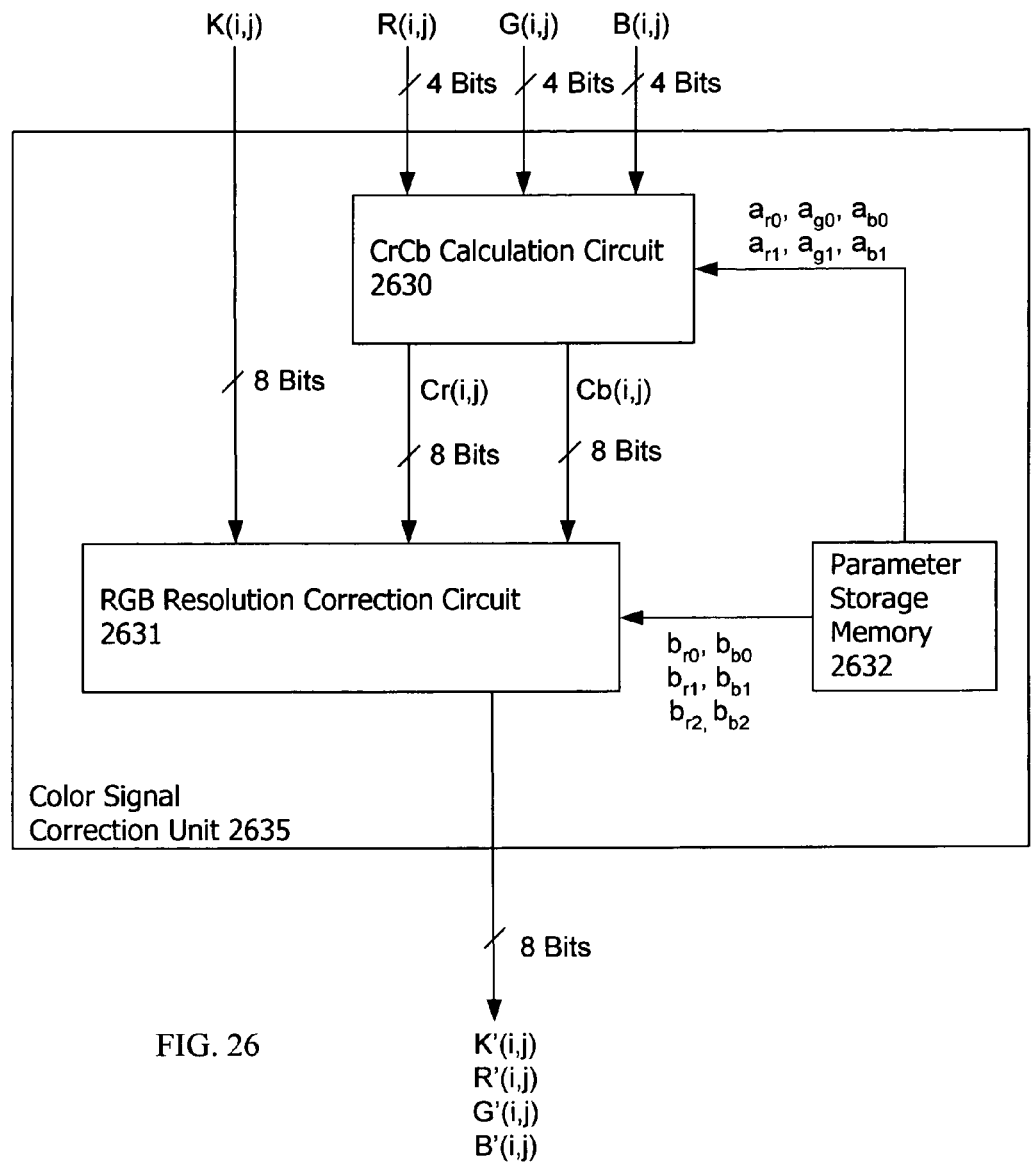
FIG. 26 is a block diagram of a color signal correction unit of the seventh embodiment.
Figure 27:
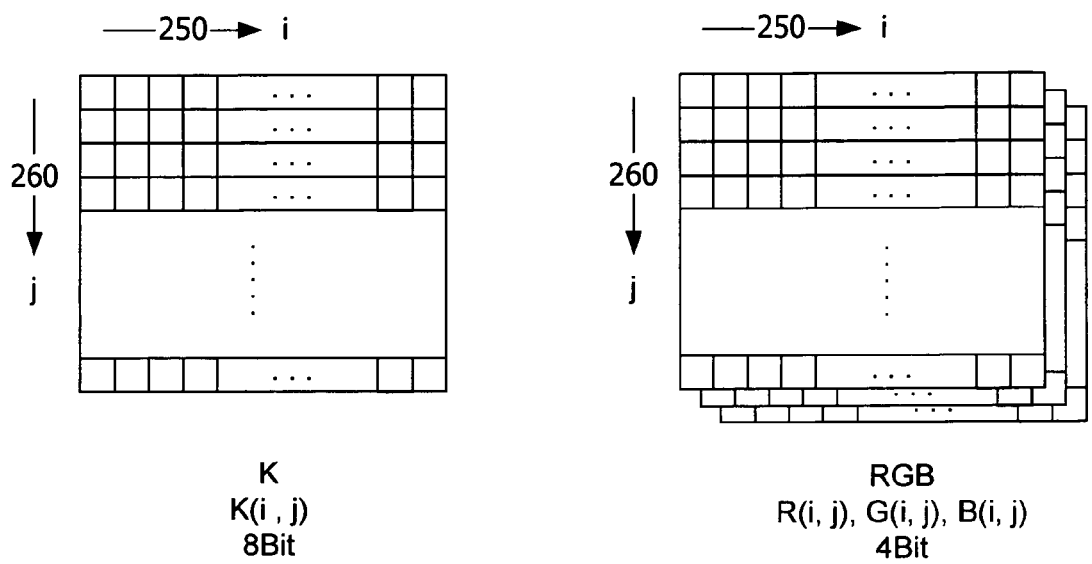
FIG. 27 is an illustration showing the outline of the process of the color signal correction unit shown in FIG. 26.

When the number of bits of a digital signal is different between color signals and monochrome signals like this, the color signal correction unit 335 may have a constitution as shown in FIG. 26. FIG. 27 is an illustration for the process of the color signal correction unit 2635 shown in FIG. 26. The color signal correction unit 2635 is a correction circuit for gradation instead of resolution and it executes a correction process of improving the gradation of a color signal using information of a monochrome signal.

The color signal correction unit 2635 has a CrCb calculation circuit 2630, an RGB resolution correction circuit 2631, and a parameter storage memory 2632.

Eight-bit monochrome pixel data K(i, j) and four-bit color pixel data R(i, j), G(i, j), and B(i, j) may be input to the color signal correction unit 2632 in a raster scan form.

The CrCb calculation circuit 2630, using the color input pixel data R(i, j), G(i, j), and B(i, j) and the parameters $a_{r0}$, $a_{g0}$, $a_{b0}$, $a_{r1}$, $a_{g1}$, and $a_{b1}$ stored in the parameter storage memory 2632, performs the YCrCb conversion indicated in Formulas (29) to (31) and obtains an eight-bit brightness signal (Y), a first color difference signal (Cr:R-Y component), and a second color difference signal (Cb:B-Y component).

$$Y(i,j)=K(i,j) \quad (29)$$

$$Cr(i,j)=a_{r0}R(i,j)+a_{g0}G(i,j)+a_{b0}B(i,j) \quad (30)$$

$$Cb(i,j)=a_{r1}R(i,j)+a_{g1}G(i,j)+a_{b1}B(i,j) \quad (31)$$

Further, the RGB resolution correction circuit 2631 executes the RGB reverse conversion meeting Formulas (32) to (34) using the parameters $b_{r0}$, $b_{r1}$, $b_{r2}$, $b_{b0}$, $b_{b1}$ and $b_{b2}$ stored in the parameter storage memory 2632 and obtains eight-bit three primary colors R', G', and B' with the resolution thereof increased.

$$R'(i,j)=K(i,j)+b_{r0}Cr(i,j)+b_{b0}Cb(l,j) \quad (32)$$

$$G'(i,j)=K(i,j)+b_{r1}Cr(i,j)+b_{b1}C\ b(i,j) \quad (33)$$

$$B'(i,j)=K(i,j)+b_{r2}Cr(l,j)+b_{b2}C\ b(i,j) \quad (34)$$

The color signals may be converted to the brightness signal (Y=K), the first color difference signal (Cr), and the second color difference signal (Cb). Inversely, the brightness signal (Y=K), the first color difference signal (Cr), and the second color difference signal (Cb) may be converted to color signals.

The color signal correction unit 2635 may sequentially perform the YCrCb conversion and RGB reverse conversion, thereby converting the four-bit color signals to eight-bit signals.

By the image sensor unit 2200 of the seventh embodiment and the image reading apparatus adopting it, almost the same effects as those of the first embodiment can be obtained. Further, miniaturization and decrease in cost of the image sensor unit 2200 may be worse than the first embodiment. However, compared with a conventional three-line CCD unit, a sufficient effect can be expected. Further, since the light receiving area of each photodiode is decided in consideration of the sensitivity of each photodiode for each primary color signal, more improvement of the color image quality can be expected.

(H) EIGHTH EMBODIMENT

The constitution of an image sensor unit of the eighth embodiment can be expressed by FIG. 22 used for explanation of the seventh embodiment. The difference from the seventh embodiment is that the height of the light receiving surface of each color photodiode in the sub-scanning direction 260 is selected in consideration of not only the sensitivity of the light receiving surface (light receiving part) but also the respect indicated below.

In the eighth embodiment, with respect to the gate control signal from the timing generation circuit 335, whenever the monochrome gate control signal SH-B/W is generated twice, the three primary color gate control signals SH-R, SH-G, SH-B are generated once. Namely, while monochrome signals are obtained in correspondence to two lines in the sub-scanning direction 260, color signals are obtained in correspondence to two lines in the sub-scanning direction 260. In consideration of the differences in the photoelectric conversion and charge storage time, the length of the light receiving surface of each color photodiode in the sub-scanning direction 260 is selected.

When the number of lines (resolution) in the sub-scanning direction 260 is different like this, a double density conversion by the inter-line correction circuit 330 in the sub-scanning direction 260 may be considered. However, in the eight embodiment, the color signal correction unit 330 may perform a double density conversion in the sub-scanning direction 260. The color signal correction unit 330 of the eighth embodiment may improve the resolution of color signals (three primary color signals) in the sub-scanning direction 260 using information of monochrome signals.

Figure 28:
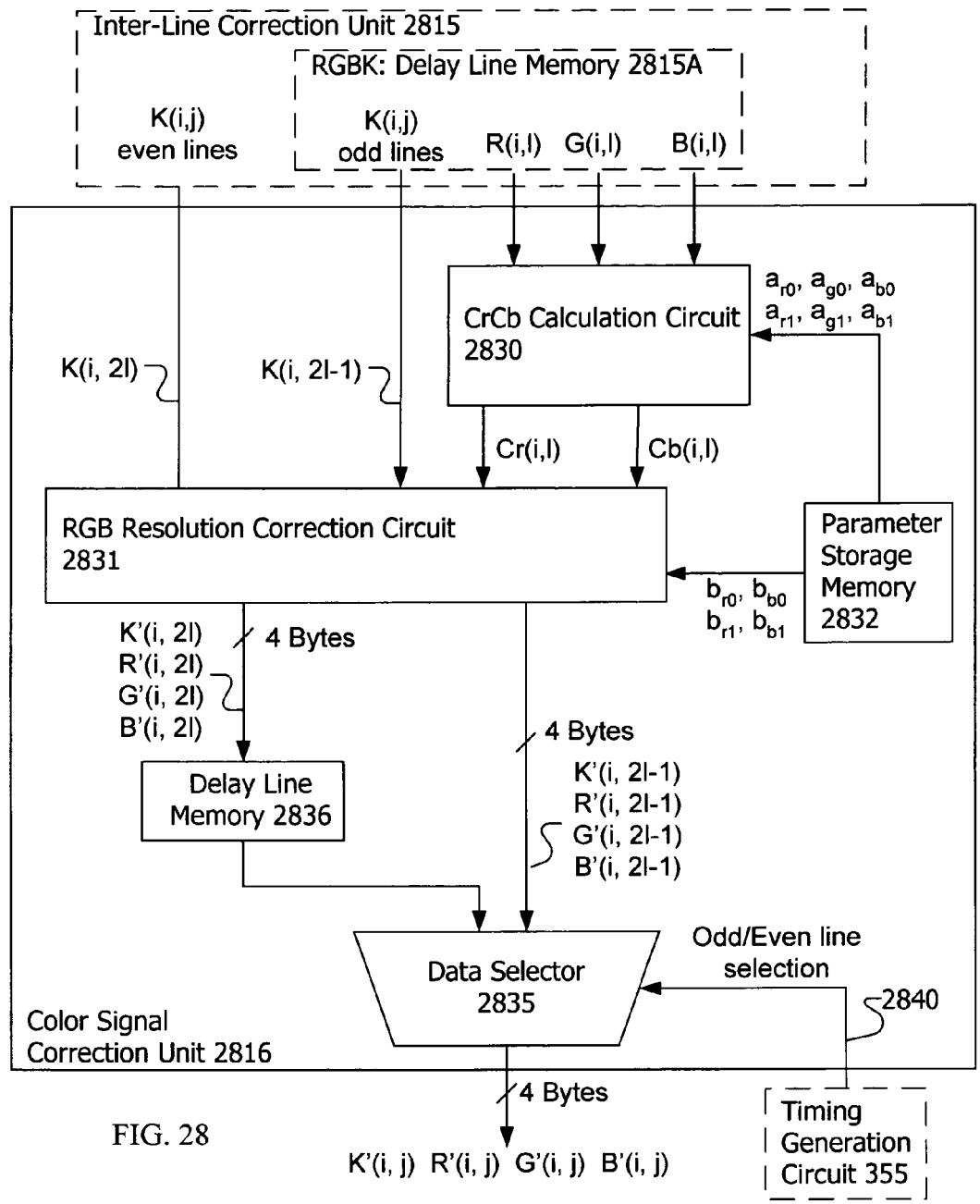
FIG. 28 is a block diagram of a color signal correction unit of the eighth embodiment.
Figure 29:
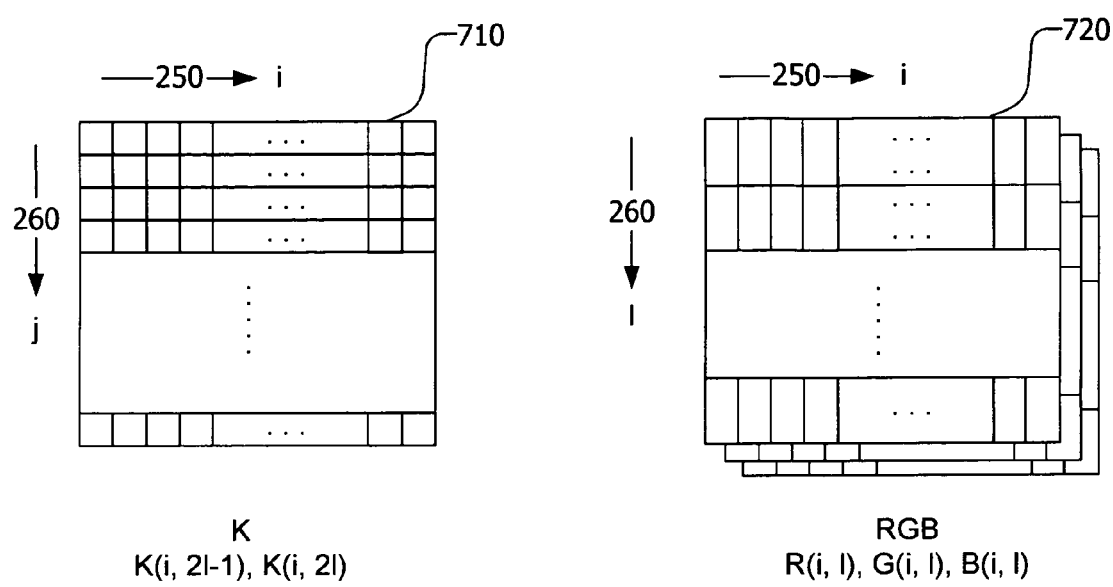
FIG. 29 is an illustration showing the outline of the process of the color signal correction unit of the eighth embodiment.

Referring now to FIG. 28, there is shown a block diagram of a color signal correction unit 2816 of the eighth embodiment. FIG. 29 is a schematic explanatory diagram of the process of the color signal correction unit 2816. Monochrome signals and color signals represented by the same number of bits are input to the color signal correction unit 2816.

In FIG. 28, the color signal correction unit 2816 has a CrCb calculation circuit 2830, an RGB resolution correction circuit 2831, a parameter storage memory 2832, a delay line memory 2836, and a data selector 2835.

The inter-line correction circuit 2815 inputs the monochrome pixel data K(i, 2l-1) and K(i, 2l) in the relation shown in parts A and B of FIG. 29 and the color pixel data R(i, l), G(i, l), and B(i, l) to the color signal correction unit 2816 in parallel. Further, a case that concurrent input of the monochrome pixel data K(i, 2l-1) and K(i, 2l) in correspondence to two lines is executed by the function of the delay line memory 2815A in the inter-line correction circuit 2815 is shown in FIG. 28. However, the color signal correction unit 2816 may be provided with a line memory corresponding to it so as to obtain the monochrome pixel data K(i, 2l-1) and K(i, 2l) in correspondence to two lines.

The CrCb calculation circuit 2830, using the color pixel data R(i, l), G(i, l), and B(i, l) and the parameters $a_{r0}$, $a_{g0}$, $a_{b0}$, $a_{r1}$, $a_{g1}$, and $a_{b1}$ stored in the parameter storage memory 2832 performs the YCrCb conversion indicated in Formulas (35) to (38).

$$Y(i,2l-1)=K(i,2l-1) \quad (35)$$

$$Y(i,2l)=K(i,2l) \quad (36)$$

$$Cr(i,k)=a_{r0}R(i,l)+a_{g0}G(i,l)+a_{b0}B(i,l) \quad (37)$$

$$Cb(i,k)=a_{r1}R(i,l)+a_{g1}G(i,l)+a_{b1}B(i,l) \quad (38)$$

The RGB resolution correction circuit 2831 executes the RGB reverse conversion meeting Formulas (39) to (44) using the parameters $b_{r0}$, $b_{r1}$, $b_{b0}$, and $b_{b1}$ stored in the parameter storage memory 2832 and obtains three primary colors R', G', B' with the resolution (the number of pixels) in the sub-scanning direction 260 increased.

$$R'(i,2l-1)=K(i,2l-1)+b_{r0}Cr(i,l) \quad (39)$$

$$G'(i,2l-1)=K(i,2l-1)-b_{r1}Cr(i,l)+b_{b1}C\ b(i,l) \quad (40)$$

$$B'(i,2l-1)=K(i,2l-1)+b_{b0}C\ b(i,l) \quad (41)$$

$$R'(i,2l)=K(i,2l)+b_{r0}Cr(i,l) \quad (42)$$

$$G'(i,2l)=K(i,2l)-b_{r1}Cr(i,l)+b_{b1}C\ b(i,l) \quad (43)$$

$$B'(i,2l)=K(i,2l)+b_{b0}Cb(i,l) \quad (44)$$

In the eighth embodiment, the number of pixels of the brightness signal Y in the main scanning direction 250 is twice the number of pixels of the first color difference signal Cr and the second color difference signal Cb in the main scanning direction 250. Thus, the number of pixels of the color signals R', G', B' in the sub-scanning direction 260 after conversion may be set to the same number of pixels as that of the brightness signal Y before conversion.

Formulas (39) to (41) are calculation expressions of data at the pixel positions on the odd lines of the three-primary color signals R', G', B' after conversion. Formulas (42) to (44) are calculation expressions of data at the pixel positions on the even lines of the color signals R', G', B' after conversion.

The RGB resolution correction circuit 2831 may give the obtained color signals R'(i, 2l–1), G'(i, 2l–1), B'(i, 2l–1) at the pixel positions on the odd lines to the data selector 2835 as a first selection input. The line memory 2836 may delay the color signals R'(i, 2l), G'(i, 2l), B'(i, 2l) at the pixel positions on the even lines by one pixel period, and then may give the signals to the data selector 2835 as a second selection input. FIG. 28 shows a case that even in the color mode, the brightness signal, that is, the monochrome signals K(i, 2l–1) and K(i, 2l) are output from the color signal correction unit 2816.

The data selector 2835, according to a discrimination signal 2840 (indicated as Odd/Even line discrimination signal in FIG. 28) on the odd or even sub-scanning lines from the timing generation circuit 335, selects and outputs R'(i, 2l–1), G'(i, 2l–1), B'(i, 2l–1) on the odd lines and R'(i, 2l), G∝(i, 2l), B∝(i, 2l) on the even lines.

By the image sensor unit of the eighth embodiment and the image reading apparatus adopting it, almost the same effects as those of the first embodiment can be obtained.

(I) NINTH EMBODIMENT

Figure 30:
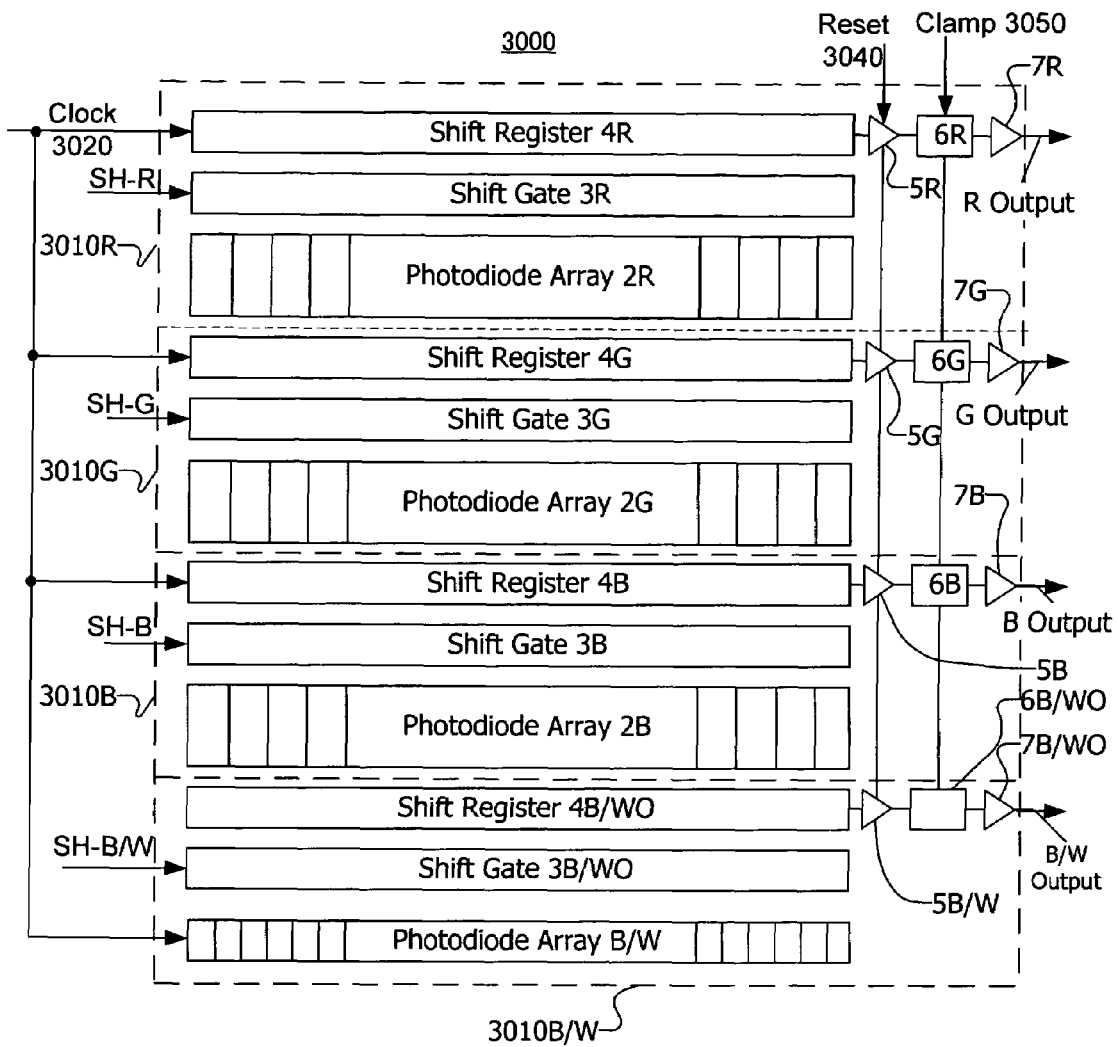
FIG. 30 is a timing chart showing the operation of the image sensor unit of the ninth embodiment.

Referring now to FIG. 30, there is shown a block diagram showing the constitution of an image sensor unit 3000 of a ninth embodiment and to the same and corresponding parts as those shown in FIG. 4 relating to the first embodiment, the same and corresponding numerals are assigned. The position of the image sensor unit 3000 to the whole image reading apparatus is the position shown in FIG. 3 in the same way as with the image sensor unit 400 of the first embodiment.

In the image sensor unit 3000, the number of photodiodes (the number of pixels) of the color photodiode arrays 2R, 2G, 2B in the main scanning direction 250 is ⅔ of the number of photodiodes (the number of pixels) of the monochrome photodiode array 2B/W in the main scanning direction 250. Thus, the length of the light receiving surface of each color photodiode in the main scanning direction 250 is 3/2 of the length of the light receiving surface of each monochrome photodiode in the main scanning direction 250. For example, the ninth embodiment can be applied to an image reading apparatus having 5000 color pixels (400 dpi) and 7500 monochrome pixels (600 dpi) in the main scanning direction 250.

According to the difference in the length of the light receiving surface in the main scanning direction 250 between the color photodiodes and the monochrome photodiodes, also in the sub-scanning direction 260, the length of the light receiving surface of the color photodiodes is longer than the length of the light receiving surface of the monochrome photodiodes.

Further, the output constitution of stored charges of the photodiode arrays is the same both in the colors and monochrome. Namely, as to each color signal and a monochrome signal, the shift gates 3R, 3G, 3B, 3B/W, shift registers 4R, 4G, 4B, 4B/W, reset gates SR, 5G, 5B, 5B/W, clamp circuits 6R, 6G, 6B, 6B/W, and amplifiers 7R, 7G, 7B, 7B/W may be installed for each channel.

Figure 31:
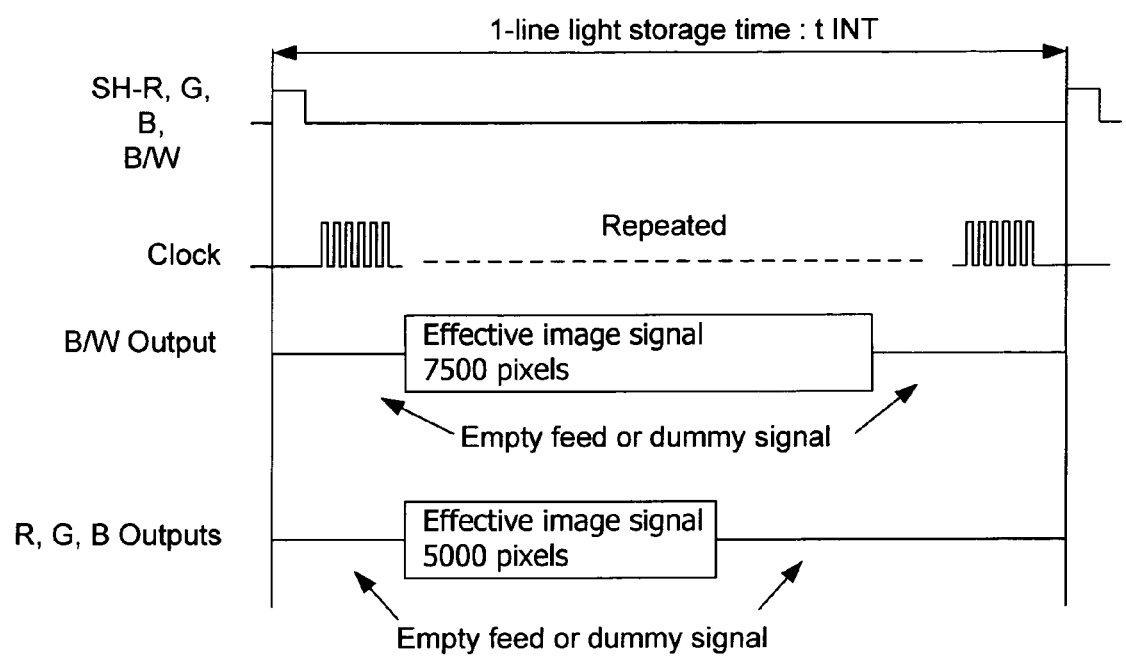
FIG. 31 is a timing chart showing the operation of the image sensor unit of the ninth embodiment.

Referring now to FIG. 31, there is shown a timing chart showing the operation of the image sensor unit 3000 of the ninth embodiment. The gate control signals SH-R, SH-G, SH-B for the three primary colors R, G, B which are given to the image sensor unit 3000 from the timing generation circuit 355 (refer to FIG. 3) and the monochrome gate control signal SH-B/W may be the same. As shown in FIG. 31, the clock signal for the shift registers 4RO, 4GO, 4BO, 4RE, 4GE, 4BE may be common. Namely, although the resolution (the number of pixels, the number of photodiodes) in the main scanning direction 250 is different between the color photodiode arrays and the monochrome photodiode array, they are driven at the same time.

By adjusting the control signals given to the reset gates 5R, 5G, 5B, 5B/W and the clamp circuits 6R, 6G, 6B, 6B/W, the effective pixel areas can be made different between the three primary colors R, G, B and the monochrome. This allows the desired resolution to be selected.

In an image reading apparatus of the ninth embodiment, the operation of the processing system for a reading image signal after the analog processing unit 315 is almost the same as that of the first embodiment.

The inter-line correction circuit 330, in consideration of differences in position between the color photodiode arrays and the monochrome photodiode array in the sub-scanning direction 260, converts and outputs an output signal from the shading correction unit 325 to a signal when the three primary colors R, G, B lines and monochrome line coincide with each other in the sub-scanning direction 260. However, the number of lines of color output in the sub-scanning direction 260 from the image sensor unit 3000 coincides with that of monochrome output. Thus, unlike the first embodiment, the inter-line correction circuit 330 does not perform an interpolation process of doubling the number of lines (resolution) in the sub-scanning direction 260 for the color output.

The color signal correction unit 335, in the main scanning direction 250, improves the resolution of signals of the three primary colors R, G, B using information of a monochrome signal. Also in this case, the color signal correction unit 335 sequentially performs the YCrCb conversion and RGB reverse conversion so as to improve the resolution. However, since the section of three monochrome pixels coincides with the section of two color pixels, the color signal correction unit 335 performs the RGB reverse conversion in consideration of it.

Figure 32:
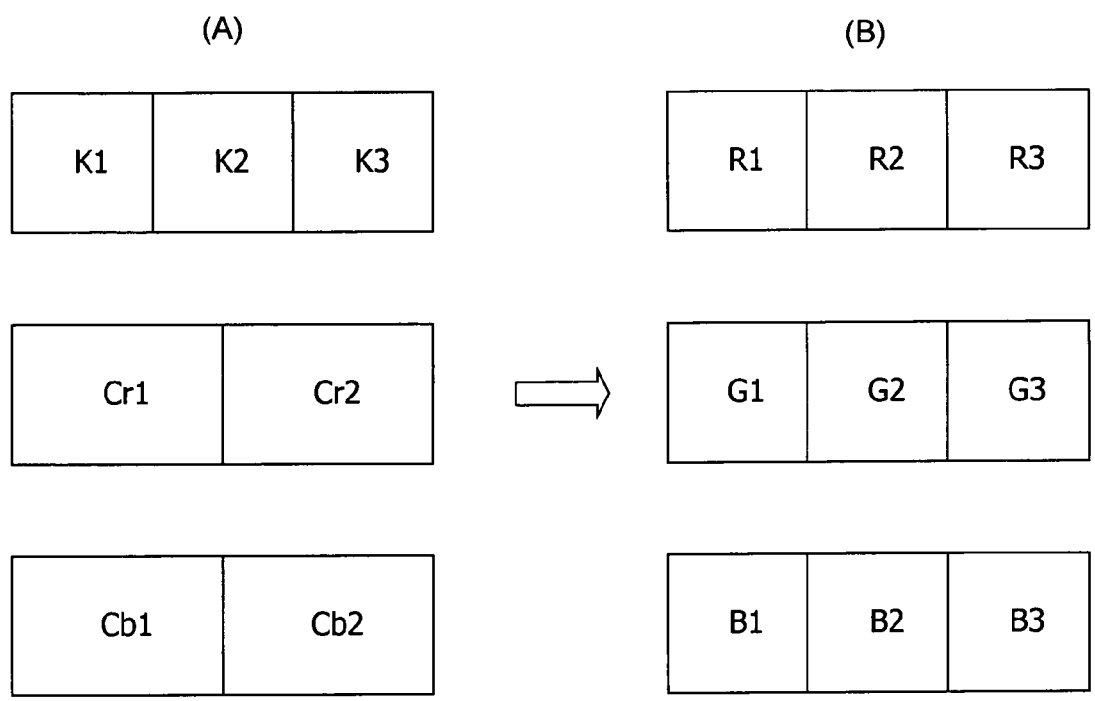
FIG. 32 is an auxiliary illustration for the process of the color signal correction unit of the ninth embodiment.

For example, in a case of Y(K), Cr, and Cb as shown in Part A of FIG. 32, the three primary colors R1, G1, B1 at the pixel position K1 may be obtained by reverse conversion of K1, Cr1, Cb1. The three primary colors R2, G2, B2 at the pixel position K2 maybe obtained by the reverse conversion for K2, (Cr1+Cr2)/2, and (Cb1+Cb2)/2. The three primary colors R1, G1, B1 at the pixel position K3 may be obtained by the reverse conversion for K3, Cr3, Cb3.

By the image sensor unit 3000 of the ninth embodiment and the image reading apparatus adopting it, almost the same effects as those of the first embodiment can be obtained.

(J) OTHER EMBODIMENTS

In the image reading apparatuses of the aforementioned embodiments, in both color mode for reading color documents and monochrome mode for reading monochrome documents, the moving speeds in the sub-scanning direction are the same. However, even in a case of different speeds, the present invention can be applied. Namely, the sensor unit of the present invention can be incorporated into an image reading apparatus that the moving speed in the sub-scanning direction is different between the color mode and the monochrome mode.

Further, in the embodiments mentioned above, the image sensor unit has a monochrome photodiode array. However, also to an image sensor unit having no monochrome photodiode array, the technical thought of the present invention can be applied. For example, the light receiving area of each photodiode for the three primary colors R, G, B may be changed with the sensitivity.

Furthermore, in the above explanation, the image sensor unit is composed of one chip. However, it may be composed of a plurality of chips.

Furthermore, in the embodiments mentioned above, also in the color mode, monochrome signals may be output. However, in the color mode, the image sensor unit may output only signals of the three primary colors R, G, B.

Further, in the above explanation, the color signal correction unit performs the resolution conversion only in one of the main scanning direction and sub-scanning direction using information of monochrome signals. However, it may perform the resolution conversion in both the main scanning direction and sub-scanning direction. For example, like the first embodiment, when the light receiving surface of each color photodiode is two times of that of each monochrome photodiode in the main scanning direction and sub-scanning direction, a method for firstly doubling the density using information of a monochrome signal in the sub-scanning direction and then doubling the density using information of a monochrome signal in the main scanning direction may be used.

Furthermore, information of a monochrome signal required by the color signal correction unit may be obtained by a reading operation different from the reading operation for obtaining a color signal. In other words, by double reading of a document, a monochrome signal and a color signal may be obtained separately.

Furthermore, in the above explanation, the color signal correction unit sequentially performs the YCrCb conversion and RGB reverse conversion. However, a method for arranging the YCrCb conversion formula and RGB reverse conversion formula, obtaining a formula for unifying and executing the YCrCb conversion and RGB reverse conversion, and unifying and executing the YCrCb conversion and RGB reverse conversion according to the formula may be adopted. Further, the color signal correction unit may be composed of hardware or software.

Further, the light receiving elements for photoelectric conversion are not limited to photodiodes and may be other photoelectric conversion elements. The shift registers are not limited to those having the CCD constitution.

Furthermore, the image sensor units of the embodiments mentioned above output three-primary color signals (R, G, B) as a color signal. However, also to an image sensor unit for outputting a combination of other color components such as yellow, cyan, and magenta, the present invention can be applied.

As mentioned above, according to the present invention, an image sensor unit and an image reading apparatus can be realized that the evaluation can be improved in more items than conventional such as the size and cost of the image sensor unit, monochrome image quality, color image quality, speed in the sub-scanning direction in the color mode, and through-pass read characteristic.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. An image reading apparatus, comprising
an image sensor unit comprising
a first photoconverter comprising a first array of first light receiving elements, the first photoconverter for photoelectrically converting light of a first color from a source image for outputting a first color signal
a second photoconverter comprising a second array of second light receiving elements, the second photoconverter for photoelectrically converting light of a second color from a source image for outputting a second color signal
a third photoconverter comprising a third array of third light receiving elements, the third photoconverter for photoelectrically converting light of a third color from a source image for outputting a third color signal
a fourth photoconverter comprising a fourth array of fourth light receiving elements, the fourth photoconverter for photoelectrically converting monochromatic light from the source image for outputting a monochrome signal
an A/D converter unit to
convert the first, second, and third color signals into respective first, second, and third digitized color signals each having a first number of bits
convert the monochrome signal to a digitized monochrome signal having a second number of bits greater than the first number of bits
a signal correction unit to
produce enhanced color signals
use the digitized monochrome signal to modify the first, second, and third digitized color signals to produce the enhanced color signals.

2. The image reading apparatus of claim 1 wherein
the enhanced color signals comprise first, second, and third digitized enhanced color signals, each having the second number of bits.

3. The image reading apparatus of claim 1 wherein the signal correction unit is for improving the color signals' gradation.

4. The image reading apparatus of claim 3 wherein the signal correction unit is further for improving the color signals' resolution.

5. The image reading apparatus of claim 1 wherein the color signals are signals of three primary colors.

6. The image reading apparatus of claim 5 wherein the first color is red, the second color is green and the third color is blue.

7. The image reading apparatus of claim 6, wherein the signal correction unit is adapted to
obtain a brightness signal from the digitized monochrome signal
obtain a first color difference signal from the first, second and third digitized color signals
obtain a second color difference signal from the first, second and third digitized color signals
obtain enhanced first, second, and third color image signals from the brightness signal and the first and second color difference signals.

8. An image reading apparatus comprising
an image sensor unit comprising
- a first photoconverter comprising a first array of first light receiving elements, the first photoconverter for photoelectrically converting light of a first color from a source image for outputting a first color signal
- a second photoconverter comprising a second array of second light receiving elements, the second photoconverter for photoelectrically converting light of a second color from a source image for outputting a second color signal
- a third photoconverter comprising a third array of third light receiving elements, the third photoconverter for photoelectrically converting light of a third color from a source image for outputting a third color signal
- a fourth photoconverter comprising a fourth away of fourth light receiving elements, the fourth photoconverter for photoelectrically converting monochromatic light from the source image for outputting a plurality of monochrome signals an A/D converter unit to
- convert the first, second, and third color signals into respective first, second, and third digitized color signals each having a first number of bits
- convert the plurality of monochrome signals to digitized monochrome signals each having a second number of bits greater than the first number of bits a signal collection unit to
- produce enhanced color signals
- use the plurality of monochrome signals to modify the first, second, and third digitized color signals to produce the enhanced color signals.

9. The image reading apparatus of claim 8, wherein the enhanced color signals comprise first, second, and third digitized enhanced color signals, each having the second number of bits.

10. The image reading apparatus of claim 8, wherein the signal correction unit is for improving the color signals' gradation.

11. The image reading apparatus of claim 10 wherein the signal correction unit is further for improving the color signals' resolution.

12. The image reading apparatus of claim 8, wherein the color signals are signals of three primary colors.

13. The image reading apparatus of claim 12, wherein the first color is red, the second color is green and the third color is blue.

14. The image reading apparatus of claim 13, wherein the signal correction unit is adapted to
- obtain brightness signals from the digitized monochrome signals
- obtain a first color difference signal from the first, second and third digitized color signals
- obtain a second color difference signal from the first, second and third digitized color signals
- obtain-enhanced first, second, and third color image signals from the brightness signals and the first and second color difference signals.

* * * * *

UNITED STATES PATENT AND TRADEMARK OFFICE
CERTIFICATE OF CORRECTION

PATENT NO. : 7,256,380 B2
APPLICATION NO. : 10/796820
DATED : August 14, 2007
INVENTOR(S) : Kamisuma et al.

It is certified that error appears in the above-identified patent and that said Letters Patent is hereby corrected as shown below:

Column 6 line 66, replace "SR" with --5R--

Column 7 line 1, replace "41OB/W" with --410B/W--

Column 11 line 58, replace "SG, SB," with --5G, 5B,--

Column 11 line 62, replace "SR, SG, SB," with --5R, 5G, 5B,--

Column 13 line 53, replace "127OB/W" with --1270B/W--

Column 13 line 61, replace "123OB/W" with --1230B/W--

Column 13 line 65, replace "127OB/W" with –1270B/W--

Column 23 line 65, replace "SR" with --5R--

Column 26 line 57, replace "coffection" with --correction--

Column 27 line 30, replace "collection" with --correction--

Signed and Sealed this

Twenty-third Day of October, 2007

JON W. DUDAS
*Director of the United States Patent and Trademark Office*